US012114328B2

(12) United States Patent
Agiwal et al.

(10) Patent No.: US 12,114,328 B2
(45) Date of Patent: *Oct. 8, 2024

(54) APPARATUS AND METHOD FOR OPERATING USER PLANE PROTOCOL STACK IN CONNECTIONLESS COMMUNICATION SYSTEM

(71) Applicant: Samsung Electronics Co., Ltd., Suwon-si (KR)

(72) Inventors: Anil Agiwal, Bangalore (IN); Kyung-Kyu Abhimanyu Kim, Seoul (KR); Young-Bin Chang, Anyang-si (KR); Kyeong-In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

This patent is subject to a terminal disclaimer.

(21) Appl. No.: 17/962,025

(22) Filed: Oct. 7, 2022

(65) Prior Publication Data

US 2023/0023801 A1    Jan. 26, 2023

Related U.S. Application Data

(63) Continuation of application No. 17/128,723, filed on Dec. 21, 2020, now Pat. No. 11,470,633, which is a (Continued)

(30) Foreign Application Priority Data

Jan. 16, 2014 (IN) .............................. 68/KOL/2014
Mar. 4, 2014 (IN) ............................ 265/KOL/2014
Jul. 18, 2014 (IN) ............................ 772/KOL/2014

(51) Int. Cl.
*H04W 72/00* (2023.01)
*H04W 72/23* (2023.01)
(Continued)

(52) U.S. Cl.
CPC ........... *H04W 72/23* (2023.01); *H04W 76/14* (2018.02); *H04W 84/042* (2013.01)

(58) Field of Classification Search
None
See application file for complete search history.

(56) References Cited

U.S. PATENT DOCUMENTS

2002/0071436 A1    6/2002  Border et al.
2003/0007510 A1    1/2003  Yeo et al.
(Continued)

FOREIGN PATENT DOCUMENTS

CN    1396780 A    2/2003
CN    102474717 A    5/2012
(Continued)

OTHER PUBLICATIONS

Chinese Office Action dated Dec. 12, 2018, issued in Chinese Application No. 201580004728.4.
(Continued)

*Primary Examiner* — Brandon M Renner
(74) *Attorney, Agent, or Firm* — Jefferson IP Law, LLP

(57) ABSTRACT

The present disclosure relates to a pre-5th-generation (5G) or 5G communication system to be provided for supporting higher data rates beyond 4th-generation (4G) communication system such as a long term evolution (LTE). A method for communication by a base station is provided. The method includes transmitting a scheduling assignment including a first part of a destination identifier (ID), and transmitting a medium access control (MAC) protocol data unit (PDU) including a MAC header including a user equipment (UE) ID and a second part of the destination ID.

10 Claims, 11 Drawing Sheets

Related U.S. Application Data continuation of application No. 16/439,189, filed on Jun. 12, 2019, now abandoned, which is a continuation of application No. 15/112,370, filed as application No. PCT/KR2015/000497 on Jan. 16, 2015, now Pat. No. 10,485,018.

(51) Int. Cl.
*H04W 76/14* (2018.01)
*H04W 84/04* (2009.01)

(56) References Cited

U.S. PATENT DOCUMENTS

| | | |
|---|---|---|
| 2006/0101225 A1 | 5/2006 | Aloni et al. |
| 2009/0141670 A1 | 6/2009 | Ho |
| 2009/0238124 A1 | 9/2009 | Pragada et al. |
| 2009/0265744 A1 | 10/2009 | Singh et al. |
| 2010/0098011 A1 | 4/2010 | Pelletier et al. |
| 2010/0208691 A1 | 8/2010 | Toyokawa |
| 2010/0315965 A1 | 12/2010 | Nemeth |
| 2011/0205972 A1 | 8/2011 | Yuk et al. |
| 2011/0286416 A1 | 11/2011 | Wang et al. |
| 2012/0122391 A1 | 5/2012 | Yokoyama |
| 2012/0157053 A1 | 6/2012 | Iwamura et al. |
| 2013/0089035 A1 | 4/2013 | Sun et al. |
| 2013/0163537 A1 | 6/2013 | Anderson et al. |
| 2013/0301553 A1 | 11/2013 | Klein |
| 2013/0315141 A1* | 11/2013 | Homchaudhuri ..... H04W 76/16 370/328 |
| 2014/0010179 A1 | 1/2014 | Lee |
| 2014/0050096 A1 | 2/2014 | Cui et al. |
| 2014/0177534 A1 | 6/2014 | Mchardy et al. |
| 2014/0204831 A1 | 7/2014 | Kim et al. |
| 2014/0307618 A1 | 10/2014 | Kim et al. |
| 2014/0376442 A1 | 12/2014 | Kim et al. |
| 2015/0003391 A1 | 1/2015 | Chen et al. |
| 2015/0045078 A1 | 2/2015 | Lee et al. |
| 2015/0085791 A1 | 3/2015 | Baghel |
| 2015/0124646 A1 | 5/2015 | Yun et al. |
| 2015/0181571 A1 | 6/2015 | Park et al. |
| 2015/0229448 A1 | 8/2015 | Cave et al. |
| 2015/0257187 A1 | 9/2015 | Kwon |
| 2015/0341937 A1 | 11/2015 | Speight et al. |
| 2016/0128093 A1 | 5/2016 | Lee et al. |
| 2016/0344469 A1 | 11/2016 | Yi et al. |
| 2017/0006649 A1 | 1/2017 | Zhao et al. |
| 2017/0019893 A1 | 1/2017 | Zhao et al. |

FOREIGN PATENT DOCUMENTS

| | | |
|---|---|---|
| CN | 102761905 A | 10/2012 |
| CN | 201410001603.3 A1 | 1/2014 |
| EP | 2469914 A1 | 6/2012 |
| KR | 10-2010-0081335 A | 7/2010 |
| KR | 10-2010-0092033 A | 8/2010 |
| KR | 10-2011-0025048 A | 3/2011 |
| KR | 10-2011-0128276 A | 11/2011 |
| KR | 10-2013-0064677 A | 6/2013 |
| WO | 2013/085138 A1 | 6/2013 |
| WO | 2013/134952 A1 | 9/2013 |
| WO | 2013/154328 A1 | 10/2013 |

OTHER PUBLICATIONS

The Chinese Office Action dated Apr. 16, 2018, issued in the Chinese Application No. 201580004728.4.
Fujitsu, "UP protocol stack configuration for D2D communication", R2-134083, 3GPP TSG RAN WG2, Nov. 11-13, 2013, San Francisco, US.
Huawei, Hisilicon, "Group management consideration and protocol stack design", R2-134140, 3GPP TSG-RAN WG2, Nov. 11-13, 2013, San Francisco, US.
Ericsson, "D2D communication addressing", R2-134237, 3GPP TSG-RAN WG2, Nov. 11-13, 2013, San Francisco, US.
Intel Corporation, "MAC PDU format for D2D 1:M communication", R2-134293, 3GPP TSG RAN WG2, Nov. 11-13, 2013, San Francisco, US.
Qualcomm Incorporated, D2D Broadcast Communication for Public Safety, 3GPP TSG-RAN WG2 #83 Bis, Oct. 7-11, 2013, R2-133484, Ljubljana, Slovenia.
European Search Report dated Sep. 14, 2017, issued in the European Application No. 15737771.4.
Korean Office Action dated Nov. 26, 2020, issued in a counterpart Korean Application No. 10-2016-7019397.
U.S. Office Action dated May 21, 2021, issued by the U.S. Patent and Trademark Office; U.S. Appl. No. 16/686,625.
Korean Notice of Allowability dated May 28, 2021, issued in a counterpart Korean Application No. 10-2016-7019397.
U.S. Office Action dated Apr. 5, 2022, issued by the U.S. Patent and Trademark Office U.S. Appl. No. 16/686,625.
Chinese Office Action dated Sep. 7, 2022, issued in a counterpart Chinese Application No. 201911293630.1.

* cited by examiner

| R | R | E | LCID |
|---|---|---|---|
| Source Identifier ||||
| Destination Identifier ||||

FIG.8

| R | R | E | LCID |
|---|---|---|---|
| Source Identifier ||||

FIG.9A

| R | R | E | LCID |
|---|---|---|---|
| Destination Identifier ||||

FIG.9B

APPARATUS AND METHOD FOR OPERATING USER PLANE PROTOCOL STACK IN CONNECTIONLESS COMMUNICATION SYSTEM

CROSS-REFERENCE TO RELATED APPLICATION(S)

This application is a continuation application of prior application Ser. No. 17/128,723, filed on Dec. 21, 2020, which will be issued as U.S. Pat. No. 11,470,633 on Oct. 11, 2022; which is a continuation application of prior application Ser. No. 16/439,189, filed on Jun. 12, 2019; which is a continuation application of prior application Ser. No. 15/112,370, filed on Jul. 18, 2016, which is a U.S. National Stage application under 35 U.S.C. § 371 of an International Patent Application filed on Jan. 16, 2015 and assigned application number PCT/KR2015/000497, which has issued as U.S. Pat. No. 10,485,018 on Nov. 19, 2019, which claimed the benefit of an Indian Patent Application filed Jan. 16, 2014 in the Indian Intellectual Property Office and assigned Serial number 68/KOL/2014, an Indian Patent Application filed Mar. 4, 2014 in the Indian Intellectual Property Office and assigned Serial number 265/KOL/2014 and an Indian Patent Application filed Jul. 18, 2014 in the Indian Intellectual Property Office and assigned the application number 772/KOL/2014, the entire disclosures of which are incorporated herein by reference.

TECHNICAL FIELD

The present disclosure relates to an apparatus and method for operating a user plane protocol stack in a connectionless communication system.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a D2D communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

In a conventional connection oriented wireless communication system, data radio bearers are established by explicit signaling between a user equipment (UE) and a base station (BS).

Applications or internet protocol (IP) flows with different quality of service (QoS) are mapped to different radio bearers.

A user plane protocol stack for data transmission/reception includes a packet data convergence protocol (PDCP) layer entity, a radio link control (RLC) layer entity, and a medium access control (MAC) layer entity.

Each radio bearer's data is processed by an independent PDCP layer entity and an independent RLC layer entity which are configured at timing of radio bearer establishment by explicit signaling. The radio bearer is identified by a radio bearer identity (RB ID). The MAC layer entity is common across all radio bearers of a UE. The PDCP layer entity and the RLC layer entity with appropriate parameters are configured and established at the UE and a BS at timing of radio bearer establishment. Each radio bearer is mapped to a logical channel in a MAC layer. The logical channel is identified using a logical channel identifier (LCID). The LCID is assigned by the BS during a radio bearer establishment process. A set of LCIDs from which a LCID is assigned to a radio bearer is specific to the UE. The same set of LCIDs is reused in other UEs.

An identification of a logical channel associated with a radio bearer in a conventional connection oriented wireless communication system will be described with reference to FIG. 1.

FIG. 1 schematically illustrates an identification of a logical channel associated with a radio bearer in a conventional connection oriented wireless communication system.

Referring to FIG. 1, the connection oriented wireless communication system includes a BS 111, a UE #1 113, and a UE #2 115.

In a downlink direction (i.e., a BS to a UE), the BS includes an LCID into a MAC header of a MAC protocol data unit (PDU) which carries a data packet or a MAC service data unit (SDU) for a related radio bearer. MAC PDUs which are specific to the UE are generated as physical layer entity packets, and the physical layer entity packets are transmitted to the UE through a radio resource which is specific to the UE by a physical layer entity in the BS.

In the UE side, the physical layer entity receives and decodes the physical layer entity packets through the radio resource which is specific to the UE, and transmits the MAC PDUs to a MAC layer entity. The MAC layer entity transmits the MAC SDUs received in the MAC PDUs to the RLC layer entity of related radio bearer based on an LCID included in the MAC header.

In a uplink direction (i.e., a UE to a BS), the UE includes the LCID into a MAC header in which a MAC PDU which carries a data packet or a MAC SDU of a related radio bearer is included. In the uplink direction, the BS receives MAC PDUs from a plurality of UEs. The BS identifies UE associated with a received MAC PDU based on the allocated uplink resource. Here, a resource in the uplink is allocated by the BS to each UE. The BS transmits the MAC SDU(s) received in the MAC PDU to the RLC layer entity of a related radio bearer for a UE which is identified based on an LCID included in the MAC header.

Meanwhile, device to device (D2D) broadcast/group cast communication enables a UE to concurrently transmit the same information to a plurality of different UEs in proximity of the UE. A D2D broadcast channel may be used by a transmitter to transmit information to all UEs in proximity of the transmitter, or to transmit information to a specific UE or UEs included in a specific group.

From a physical channel, each broadcast channel is the same irrespective of broadcast, unicast or multicast of information which is transmitted by the transmitter. Further, D2D communication is also connectionless. That is, in the D2D communication, there is no explicit signaling between communicating devices for establishing a connection.

A user plane protocol stack for data transmission/reception for the D2D communication also includes a PDCP layer entity, a RLC layer entity, and a MAC layer entity.

In the connectionless D2D communication, key issues regarding configuration of a user plane protocol stack in a transmitter and a receiver are as the following.

The first issue is how to establish and configure radio bearers and a logical channel in a connectionless approach.

The second issue is how many radio bearers are configured in a transmitter/receiver and when.

The third issue is how to identify a radio bearer in a transmitter and a receiver.

So, there is a need of operating a user plane protocol stack by considering the above issues in a connectionless communication system.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to propose an apparatus and method for operating a user plane protocol stack in a connectionless communication system.

Another aspect of the present disclosure is to propose an apparatus and method for operating a user plane protocol stack by considering a radio bearer in a connectionless communication system.

Another aspect of the present disclosure is to propose an apparatus and method for operating a user plane protocol stack by considering a logical channel in a connectionless communication system.

Another aspect of the present disclosure is to propose an apparatus and method for operating a user plane protocol stack based on a source ID and a destination ID in a connectionless communication system.

Another aspect of the present disclosure is to propose an apparatus and method for operating a user plane protocol stack based on a transmission session type in a connectionless communication system.

Another aspect of the present disclosure is to propose an apparatus and method for operating a user plane protocol stack by considering data compression in a connectionless communication system.

In accordance with an aspect of the present disclosure, a method for communication by a base station is provided. The method includes dividing a destination ID into a first part and a second part, transmitting a scheduling assignment including a first part of the destination ID, and transmitting a medium access control (MAC) protocol data unit (PDU) including a UE identifier and a second part of the destination ID in a MAC header of the MAC PDU.

In accordance with another aspect of the present disclosure, a method for communication by a user equipment (UE) is provided. The method includes receiving a scheduling assignment; receiving a medium access control (MAC) protocol data unit (PDU); determining whether the received MAC PDU is destined for the UE; determining whether there is a packet data convergence protocol (PDCP) layer entity and a radio link control (RLC) layer entity for data reception corresponding to a MAC service data unit (SDU) received in the MAC PDU destined for the UE; establishing a new PDCP layer entity and a new RLC layer entity for data reception corresponding to the MAC SDU, if the PDCP layer entity and the RLC layer entity for data reception corresponding to the MAC SDU received in the MAC PDU is not already established; and delivering the MAC SDU to an RLC layer entity corresponding to a source UE ID, a logical channel identifier (LCID), and a destination ID of the MAC SDU for processing.

In accordance with still another aspect of the present disclosure, an apparatus for communication being adapted to perform the method is provided.

In accordance with still another aspect of the present disclosure, a method for communication by a base station is provided. The method includes transmitting a scheduling assignment including a first part of a destination identifier (ID); and transmitting a medium access control (MAC) protocol data unit (PDU) including a MAC header including a user equipment (UE) ID and a second part of the destination ID.

In accordance with still another aspect of the present disclosure, a method for communication by a user equipment (UE) is provided. The method includes receiving a scheduling assignment; receiving a medium access control (MAC) protocol data unit (PDU); determining whether the received MAC PDU is destined for the UE; determining whether there is a packet data convergence protocol (PDCP) layer entity and a radio link control (RLC) layer entity for data reception corresponding to a MAC service data unit (SDU) included in the MAC PDU if the received MAC PDU is destined for the UE; establishing a new PDCP layer entity and a new RLC layer entity for data reception corresponding to the MAC SDU, if there are no PDCP layer entity and RLC layer entity for data reception corresponding to the MAC SDU; and delivering the MAC SDU to an RLC layer entity corresponding to a source UE identifier (ID), a logical channel identifier (LCID), and a destination ID of the MAC SDU for processing.

In accordance with still another aspect of the present disclosure, a base station is provided. The base station includes a processor configured to transmit a scheduling assignment including a first part of a destination identifier (ID), and transmit a medium access control (MAC) protocol data unit (PDU) including a MAC header including a user equipment (UE) ID and a second part of the destination ID.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith, "as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which:

FIG. 8 schematically illustrates an example of a format of a MAC sub-header indicating a source UE ID and a destination ID in a connectionless communication system according to an embodiment of the present disclosure;

FIG. 9A schematically illustrates a format of a MAC sub-header indicating a source UE ID in a connectionless communication system according to an embodiment of the present disclosure;

FIG. 9B schematically illustrates a format of a MAC sub-header indicating a destination ID in a connectionless communication system according to an embodiment of the present disclosure;

Throughout the drawings, it should be noted that like reference numbers are used to depict the same or similar elements, features, and structures.

DETAILED DESCRIPTION

Figure 1:
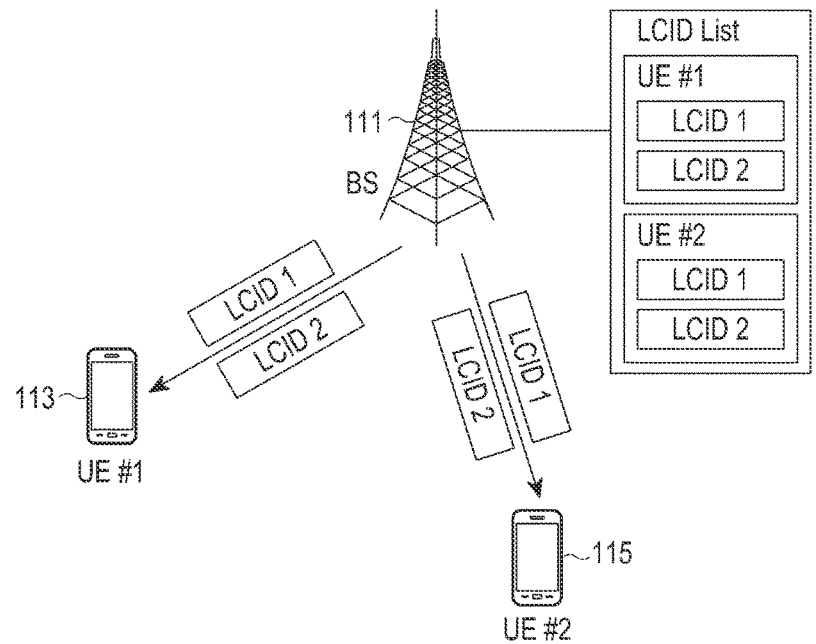
FIG. 1 schematically illustrates an identification of a logical channel associated with a radio bearer in a conventional connection oriented wireless communication system.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a user equipment (UE) may be an electronic device.

An embodiment of the present disclosure proposes an apparatus and method for operating a user plane protocol stack in a connectionless communication system.

An embodiment of the present disclosure proposes an apparatus and method for operating a user plane protocol stack by considering a radio bearer in a connectionless communication system.

An embodiment of the present disclosure proposes an apparatus and method for operating a user plane protocol stack by considering a logical channel in a connectionless communication system.

An embodiment of the present disclosure proposes an apparatus and method for operating a user plane protocol stack based on a source UE identifier (ID) and a destination ID in a connectionless communication system.

An embodiment of the present disclosure proposes an apparatus and method for operating a user plane protocol stack based on a transmission session type in a connectionless communication system.

An embodiment of the present disclosure proposes an apparatus and method for operating a user plane protocol stack by considering data compression in a connectionless communication system.

An embodiment of the present disclosure proposes three schemes for user plane protocol stack configuration, i.e., a user plane protocol stack configuration scheme #1, a user plane protocol stack configuration scheme #2 and a user plane protocol stack configuration scheme #3, and this will be described below.

Firstly, a user plane protocol stack configuration scheme #1 will be described below.

A user plane protocol stack configuration scheme #1 for a data transmission in a D2D communication system will be described below.

A UE which transmits data to one or more UEs may maintain a radio bearer for D2D data transmission. The radio bearer includes a packet data convergence protocol (PDCP) layer entity and a radio link control (RLC) entity. The UE performs a transmission session (that is, a TX session) at a time during which the UE performs one of a broadcast session, a group cast session, a unicast session at a time. The radio bearer is mapped to a logical channel, and the logical channel is mapped to a D2D communication transport channel which is mapped to a D2D communication physical channel.

The radio bearer (i.e. the PDCP layer entity and the RLC layer entity) for the data transmission is established or created when the upper layer entity triggers a data transmission in a UE. The upper layer entity may be a Prefix Routing over Set Elements (ProSe) Protocol entity or a Application Protocol entity. The PDCP layer entity and the RLC layer entity are established or created and configured using default values.

The upper layer entity may indicate whether the data transmission in the UE is a broadcast transmission, a unicast transmission, or a group cast transmission. That is, the upper layer entity may indicate the data transmission in the UE is the broadcast transmission, the unicast transmission, or the group cast transmission by transmitting information which indicates that the data transmission in the UE is the broadcast transmission, the unicast transmission, or the group cast transmission. If the data transmission is the unicast transmission then the upper layer entity provides the destination UE ID. If the data transmission is the groupcast transmission, then upper layer provides the destination Group ID. The UE ID of the UE may also be provided by the upper layer entity.

The established/created PDCP layer entity and RLC layer entity are released if the upper layer entity stops the data transmission or initiates a new data transmission session to a new destination. In the UE, a radio bearer (i.e. a PDCP layer entity and a RLC layer entity) which is established/created for a data transmission is released if the upper layer entity determines to release the radio bearer (i.e. the PDCP layer entity and the RLC layer entity) which is established/created for the data transmission.

The radio bearer (i.e. the PDCP layer entity and the RLC layer entity) in the transmitting UE (that is, TX UE) is identified by a destination ID, wherein the destination ID identifies the destination of data being transmitted. The destination ID can be at least one of a broadcast ID or a group ID or a UE ID. Alternately, the radio bearer (i.e. the PDCP layer entity and the RLC layer entity) in the transmitting UE for data transmission belong to a group may be identified by a transmitting UE ID & a destination Group ID.

During the data transmission, the PDCP layer entity processes packets (i.e. applies at least one of a security, a header compression, and a sequence numbering to the packets), the packets received from upper layer are sent to the RLC layer entity. The RLC layer processes these packets (i.e, applies at least one of a sequence numbering, and a fragmentation to these packets (i.e. RLC SDUs)) and sends them to a MAC layer entity. The MAC layer entity transmits one or more of these packets (i.e. MAC SDUs) corresponding to the same destination ID in the MAC PDU.

During the data transmission, the UE includes a source identifier field in a MAC header of the MAC PDU. The source identifier field carries an identity of a source of the MAC PDU. The source identifier field is set by the transmitting UE to its UE ID. Alternately, the source identifier field is set to a part of its UE ID. If the size of UE ID is m bits, the part of the UE ID may be n bits among the m bits, the n bits may be least significant bits (LSBs). Here, n is less than m (n<m). The n bits may be most significant bits (MSBs). If the source identifier field is set to a part of the UE ID, whether the part of the UE ID is n LSBs or n MSBs of m bits UE ID may be pre-defined in the communication system.

In some D2D communication systems, scheduling assignment information may be transmitted by a UE which transmits data. The scheduling assignment information is transmitted before a MAC PDU which carries the data is transmitted. The remaining part of the UE ID which is not included in the MAC header of the MAC PDU is included in the scheduling assignment information transmitted by the UE prior to data transmission. The remaining part of the UE ID which is not included in the MAC header of the MAC PDU may be included in a Cyclic Redundancy Check (CRC) mask of the scheduling assignment information. Alternatively, the source identifier field included in the MAC header may be a shortened UE ID. For example, the UE ID is shortened using a hashing function.

During the data transmission, the UE includes the destination identifier field in MAC header. The destination identifier field carries the identity of the destination of MAC PDU. The destination identifier field is set to destination ID. The destination ID may be a broadcast ID, a unicast ID, or a group ID of a group. Alternately destination identifier field is set to a part of the destination ID. If the size of destination ID is m bits, the part of the destination ID may be n bits among the m bits, the n bits may be least significant bits (LSBs). Here, n is less than m (n<m). The n bits may be most significant bits (MSBs). If the destination identifier field is set to part of the destination ID, whether the part of the destination ID is n LSBs or n MSBs of m bits destination ID may be pre-defined in the communication system.

In some D2D communication systems, scheduling assignment information may be transmitted by a UE which transmits data. The scheduling assignment information is transmitted before a MAC PDU which carries the data is transmitted. The remaining part of the destination ID which is not included in the MAC header of the MAC PDU is included in the scheduling assignment information transmitted by the UE prior to data transmission. The remaining part of the destination ID which is not included in a MAC header of the MAC PDU may be included in CRC mask of the scheduling assignment information.

Alternatively, the destination ID or the part of destination ID may be included in a CRC by masking the CRC with the destination ID or the part of the destination ID. Alternatively, the part of the destination ID may be included in the CRC by masking the CRC with the destination ID, and a remaining part of the destination ID may be included in the MAC header. The CRC is included in a physical layer entity packet which carries a MAC protocol data unit (PDU).

If pre-filtering for packets in the MAC layer entity is not required, and/or if a security scheme is not applied at a radio bearer level, i.e., in the PDCP layer entity or the MAC layer entity, the destination ID or the part of the destination ID may not be required in the MAC header or the CRC mask.

A broadcast indicator bit may be included in the MAC header. Here, the broadcast indicator bit may be implemented with 1 bit. For example, if a value of the broadcast indicator bit is set to 0, it means that a destination ID, i.e., a unicast ID, a group cast ID, or a part of the destination ID may be included in the MAC header. If the value of the broadcast indicator bit is not set to 0, that is, the value of the broadcast indicator bit is set to 1, it means that the destination ID (i.e., the unicast ID or the group cast ID), or the part of the destination ID may not be included in the MAC header.

The broadcast indicator bit, and the destination ID or the part of the destination ID (i.e., the unicast ID, the group cast ID, a part of the unicast ID, or a part of the group cast ID) may be included in a CRC mask instead of the MAC header. If the pre-filtering for the packets in the MAC layer entity is not required, and/or if the security scheme is not applied at the radio bearer level (i.e., in the PDCP layer entity or the MAC layer entity), the broadcast indicator bit, and the destination ID or the part of the destination ID (i.e., the unicast ID, the group cast ID, the part of the unicast ID, or the part of the group cast ID) may not be required in the MAC header or the CRC mask.

In some communication systems, scheduling assignment information may be transmitted by a UE which transmits data. The scheduling assignment information is transmitted before a MAC PDU which carries the data is transmitted. In the communication systems, a source UE ID, i.e., a full source UE ID, a partial source UE ID, or a shortened source UE ID, and a destination ID, i.e., a full destination ID, a partial destination ID, or a shortened destination ID may be encoded in the scheduling assignment information.

A process of encoding the source UE ID and the destination ID will be described below.

Firstly, the source UE ID is included as a field in scheduling assignment information. The destination ID is encoded in a CRC included in the scheduling assignment information. Here, a CRC mask includes the destination ID.

Secondly, at least one of the source UE ID and the destination ID is included as a field in the scheduling assignment information.

Thirdly, the destination UE ID is included as a field in the scheduling assignment information. The source UE ID is encoded in a CRC included in the scheduling assignment information. Here, a CRC mask includes the source ID.

Meanwhile, a control indicator may be included in the MAC header. The control indicator may be implemented with c bits. In an embodiment of the present disclosure, it will be assumed that the control indicator is implemented with 2 bits. The control indicator may indicate whether a MAC PDU is broadcasted, unicasted, or group casted.

Firstly, if the control indicator indicates that the MAC PDU is broadcasted, the source UE ID and the destination ID are not included in the MAC header.

Secondly, if the control indicator indicates that the MAC PDU is group casted, the source UE ID or a part of the source UE ID, and a group ID is included in the MAC header.

Thirdly, if the control indicator indicates that the MAC PDU is unicasted, the source UE ID or the part of the source UE ID, and the destination ID or a part of the destination ID are included in the MAC header. The part of the source UE ID may be a shortened source UE ID, and the shortened source UE ID is generated by shortening the source UE ID using a hashing function. The group ID and an individual ID are assigned to UEs from independent address spaces. The control indicator and the destination ID, i.e., a unicast ID, a group cast ID, a part of the unicast ID, or a part of the group cast ID may be included in a CRC mask instead of the MAC header.

A user plane protocol stack configuration scheme #1 for a data transmission has been described above, and a user plane protocol stack configuration scheme #1 for a data reception will be described below.

The user plane protocol stack configuration scheme #1 for the data reception is based on one of the first implementation scheme to the fourth implementation scheme, and the user plane protocol stack configuration scheme #1 for the data reception which is based on each of the first implementation scheme to the fourth implementation scheme will be described below.

Firstly, a user plane protocol stack configuration scheme #1 for a data reception which is based on the first implementation scheme will be described below.

A UE receives data from one UE at a time. A UE which receives data maintains only one radio bearer (i.e. a PDCP layer entity and a RLC layer entity) for a data reception. In this case, a user plane protocol stack includes one PDCP layer entity, one RLC layer entity, and one MAC layer entity.

The radio bearer, i.e., a PDCP layer entity and a RLC layer entity are identified by a source identifier, i.e. a UE ID of a UE from which the UE receives the data.

An example of a structure of a user plane protocol stack for a data transmission and reception which is based on a user plane protocol stack configuration scheme #1 in a connectionless communication system according to an embodiment of the present disclosure will be described with reference to FIG. 2.

Figure 2:
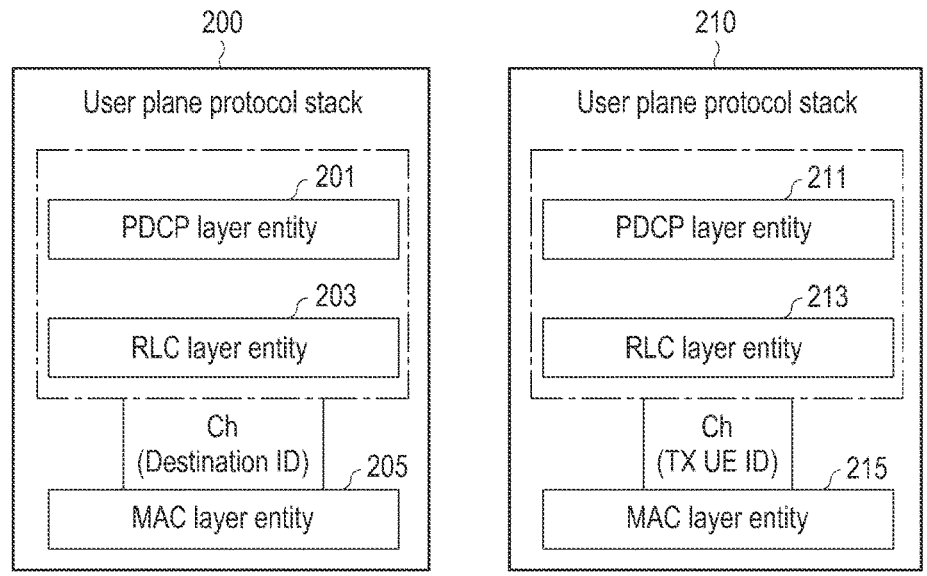
FIG. 2 schematically illustrates an example of a structure of a user plane protocol stack for a data transmission and reception which is based on a user plane protocol stack configuration scheme #1 in a connectionless communication system according to an embodiment of the present disclosure.

FIG. 2 schematically illustrates an example of a structure of a user plane protocol stack for a data transmission and reception which is based on a user plane protocol stack configuration scheme #1 in a connectionless communication system according to an embodiment of the present disclosure.

Referring to FIG. 2, the user plane protocol stack 200 for data transmission includes a PDCP layer entity 201, a RLC layer entity 203 and a MAC layer entity 205. The PDCP layer entity 201 and the RLC layer entity 203 are identified by a destination ID. The user plane protocol stack 210 for data reception includes a PDCP layer entity 211, a RLC layer entity 213 and a MAC layer entity 215. The PDCP layer entity 211 and the RLC layer entity 213 are identified by a source identifier, i.e. a UE ID of a UE from which the UE receives the data.

A user plane protocol stack configuration scheme #1 for a data reception which is based on the first implementation scheme will be described below.

1) Filtering by a physical layer entity using a destination identifier in a scheduling assignment:

The physical layer entity (not shown in FIG. 2) in the UE receives the scheduling assignment and determines whether the scheduling assignment is destined for the UE. The destination identifier field in the scheduling assignment indicates a destination ID (i.e. a group ID or a broadcast ID or a UE ID). The physical layer entity receives and decodes a physical layer packet carrying a MAC PDU, and sends the MAC PDU to a MAC layer entity if the destination identifier field in the scheduling assignment is equal to the group ID of a group of which the UE is a member or if the destination identifier field in the scheduling assignment is equal to the UE ID or if the destination identifier field in the scheduling assignment is equal to the broadcast ID.

Alternately, the destination identifier field in the scheduling assignment indicates a part of the destination ID (for example, the part is n LSBs or MSBs of the destination ID). The physical layer entity receives and decodes a physical layer packet carrying a MAC PDU, and sends the MAC PDU to a MAC layer entity if the destination identifier field in the scheduling assignment is equal to a part of the group ID of a group of which the UE is a member or if the destination identifier field in the scheduling assignment is equal to a part of the UE ID or if the destination identifier field in the scheduling assignment is equal to a part of the broadcast ID.

Filtering by the physical layer entity is performed only if the scheduling assignment with the destination ID is transmitted in the system.

2) Filtering by the MAC layer entity 205 using a destination identifier in a MAC PDU:

The MAC layer entity 215 in the UE receives a MAC PDU from a physical layer entity (not shown in FIG. 2), and determines whether the MAC PDU which is received from the physical layer entity is destined for the UE. The destination identifier field in a MAC header of the MAC PDU indicates a destination ID (i.e. a group ID or a broadcast ID or a UE ID). The received MAC PDU is destined for the UE if the destination identifier field is equal to the group ID of a group of which the UE is a member or if the destination identifier field is equal to the UE ID or if the destination identifier field is equal to the broadcast ID.

The destination identifier field in the MAC header of the MAC PDU may indicate a part of the destination ID (i.e. n LSBs or n MSBs of the group ID or the broadcast ID or the UE ID). The received MAC PDU is destined for the UE if the destination identifier field is equal to a part of the group ID of a group of which the UE is a member or if the destination identifier field is equal to a part of the UE ID or if the destination identifier field is equal to a part of the broadcast ID. Filtering by the MAC layer entity 215 is performed only if the MAC PDU with the destination ID is transmitted in the system. If the MAC PDU which is received from the physical layer entity is not destined for the UE then the MAC layer entity may discard the MAC PDU.

3) Determination of a source identifier and Filtering by the MAC layer entity 215 using the source identifier:

The MAC layer entity 215 determines a UE ID of a UE which transmits the MAC PDU. For example, the operation of determining the UE ID of the UE which transmits the MAC PDU may be performed by reading the source identifier field from a MAC header. Alternatively, the operation of determining the UE ID of the UE which transmits the MAC PDU may be performed by reading the source identifier field from scheduling assignment information. This filtering may be optional. The MAC layer entity 215 in the UE may determine whether the UE ID of a UE which transmits the MAC PDU is of interest to the UE. If not, then the MAC layer entity 215 discards the MAC PDU.

4) The MAC layer entity 215 in the UE determines whether there is a radio bearer (i.e. a PDCP layer entity and a RLC layer entity) for a data reception corresponding to the source identifier, i.e. the UE ID of a UE from which UE has received the MAC PDU.

a) If a radio bearer (i.e. a PDCP layer entity and a RLC layer entity) for data reception is not already established/created then, the MAC layer entity 215 triggers creation of a new radio bearer (i.e. the PDCP layer entity and the RLC layer entity for a data reception, and identifies the created radio bearer (i.e. the PDCP layer entity and the RLC layer entity) for the data reception using a source identifier of the received MAC PDU. The MAC layer entity 215 transmits MAC service data units (SDUs) included in the MAC PDU to the RLC layer entity 213 corresponding to the new radio bearer. The PDCP layer entity 211 and the RLC layer entity 213 are configured using default (or pre-configured) values.

b) If a radio bearer (i.e. a PDCP layer entity and a RLC layer entity) is already established/created for the data reception, and if the source identifier of the received MAC PDU is different from a source identifier of existing radio bearer for a data reception, the MAC layer entity 215 triggers release of the existing radio bearer (i.e. the PDCP layer entity and the RLC layer entity) and establishment of a radio bearer (i.e. the PDCP layer entity and the RLC layer entity), and identifies the the radio bearer (i.e. the PDCP layer entity and the RLC layer entity) using a source identifier included in the received MAC PDU.

Alternatively, if the radio bearer (i.e. the PDCP layer entity and the RLC layer entity) for the data reception is already established/created, and if the source identifier of the received MAC PDU is different from the source identifier of the existing radio bearer for the data reception, and has preference higher than preference of the source identifier of the existing radio bearer (i.e. the PDCP layer entity and the RLC layer entity) for the data reception, the MAC layer entity 215 triggers release of the existing radio bearer (i.e. the PDCP layer entity and the RLC layer entity) for the data reception and establishment of the new radio bearer (i.e. a PDCP layer entity and a RLC layer entity) for the data reception, and identifies the new radio bearer (i.e. the PDCP layer entity and the RLC layer entity) for the data reception using the source identifier included in the received MAC PDU.

Alternatively, if the radio bearer (i.e. the PDCP layer entity and the RLC layer entity) for the data reception exists, and if the source identifier of the received MAC PDU is different from the source identifier of the existing radio bearer (i.e. the PDCP layer entity and the RLC layer entity) for the data reception, and a service for a new source identifier has preference higher than preference of a service for a current source identifier, the MAC layer entity 215 triggers release of the old radio bearer (i.e. the PDCP layer entity and the RLC layer entity) for the data reception, and establishment of a new radio bearer (i.e. a PDCP layer entity and a RLC layer entity) for a data reception, and identifies the new radio bearer (i.e. the PDCP layer entity and the RLC layer entity) for the data reception using the source identifier of the received MAC PDU.

Here, a service indicator may be included in the MAC PDU, or a service priority may be included in the MAC PDU. For example, the service indicator indicates a service type of a related service, and may indicate that the related service is a voice service or a data service. The MAC layer entity 215 transmits the MAC SDU(s) included in the MAC PDU to the RLC layer entity 213 corresponding to the new radio bearer.

c) If the radio bearer (i.e. the PDCP layer entity and the RLC layer entity) are already established for the data reception, and if the source identifier of the received MAC PDU is identical to a source identifier of already established radio bearer for a data reception, the MAC layer entity 215 transmits the MAC SDUs included in the MAC PDU to the RLC layer entity corresponding to the radio bearer.

Meanwhile, if there is no activity for a pre-defined time period, a radio bearer (i.e. a PDCP layer entity and a RLC layer entity) for the data reception are released. The established radio bearer (i.e. the PDCP layer entity and the RLC layer entity) for the data reception are released if the upper layer entity indicates to stop monitoring D2D communication.

A user plane protocol stack configuration scheme #1 for a data reception which is based on the first implementation scheme has been described above, and a user plane protocol stack configuration scheme #1 for a data reception which is based on the second implementation scheme will be described below.

A UE receives data from one UE at a time. The UE which receives the data maintains only one radio bearer (i.e. a PDCP layer entity and a RLC layer entity) for a data reception.

The user plane protocol stack includes one PDCP layer entity, one RLC layer entity, and one MAC layer entity. The radio bearer, i.e., a PDCP layer entity and a RLC layer entity are identified by a source identifier, i.e. UE ID of a UE from which the UE receives data. A structure of the user plane protocol stack is identical to a structure of a user plane protocol stack illustrated in FIG. 2.

The UE establishes a default radio bearer (i.e. a PDCP layer entity and a RLC layer entity) using default configuration when the upper layer entity triggers to monitor D2D communication. The established default radio bearer (i.e. the PDCP layer entity and the RLC layer entity) is not associated with a source identifier, and a source identifier corresponding to the established default radio bearer (i.e. the PDCP layer entity and the RLC layer entity) is null. For convenience, a source identifier which is null is called a null source identifier.

An operating process of a UE in the user plane protocol stack configuration scheme #1 for the data reception which is based on the second implementation scheme will be described below.

1) Filtering by Physical layer entity using destination identifier in scheduling assignment:

The physical layer entity in the UE receives the scheduling assignment and determines whether the scheduling assignment is destined for the UE. The destination identifier field in scheduling assignment information indicates destination ID (i.e. group ID or broadcast ID or UE ID). The physical layer entity receives, decodes the physical layer packet carrying MAC PDU and sends the MAC PDU to MAC layer entity if the destination identifier field in the scheduling assignment is equal to group ID of group of which the UE is a member or if the destination identifier field in the scheduling assignment is equal to UE ID or if the destination identifier field in the scheduling assignment is equal to broadcast ID.

Alternately, the destination identifier field in scheduling assignment information indicates part of destination ID (for example part is n LSBs or MSBs of destination ID). The physical layer entity receives, decodes the physical layer packet carrying MAC PDU and sends the MAC PDU to MAC layer entity if the destination identifier field in the scheduling assignment is equal to part of group ID of group of which the UE is a member or if the destination identifier field in the scheduling assignment is equal to part of UE ID or if the destination identifier field in the scheduling assignment is equal to part of broadcast ID.

Filtering by physical layer entity is performed only if scheduling assignment with destination ID is transmitted in the system.

2) Filtering by MAC layer entity using destination identifier in MAC PDU:

The MAC layer entity 215 in the UE receives a MAC PDU from a physical layer entity, and determines whether the MAC PDU is destined for the UE. The destination identifier field in MAC header of MAC PDU indicates destination ID (i.e. group ID or broadcast ID or UE ID). The received MAC PDU is destined for the UE if the destination identifier field is equal to group ID of group of which the UE is a member or if the destination identifier field is equal to UE ID or if the destination identifier field is equal to broadcast ID. The destination identifier field in MAC header of MAC PDU indicates part of destination ID (i.e. n LSBs or n MSBs of group ID or broadcast ID or UE ID). The received MAC PDU is destined for the UE if the destination identifier field is equal to part of group ID of group of which the UE is a member or if the destination identifier field is equal to part of UE ID or if the destination identifier field is equal to part of broadcast ID. Filtering by MAC layer entity is performed only if MAC PDU with destination ID is transmitted in the system.

3) Determination of a source identifier and Filtering by MAC layer entity using source identifier:

The MAC layer entity 215 determines a UE ID of a UE which transmits the MAC PDU. For example, the UE ID of the UE which transmits the MAC PDU may be determined by reading the source identifier field from a MAC header. Alternatively, the UE ID of the UE which transmits the MAC PDU may be determined by reading the source identifier field from scheduling assignment information. This filtering is optional. The MAC layer entity 215 in the UE may determine whether the UE ID of a UE which transmits the MAC PDU is of interest to the UE. If not, then the MAC layer entity 215 discards the MAC PDU.

4) The MAC layer entity 215 determines whether there is a radio bearer (i.e. a PDCP layer entity and a RLC layer entity) for a data reception corresponding to the source identifier, i.e. a UE ID of a UE from which a UE has received the MAC PDU.

a) If there is no radio bearer (i.e. a PDCP layer entity and a RLC layer entity) which is already established for a data reception except the default radio bearer, the MAC layer entity 215 uses the default radio bearer. The null source identifier for the default radio bearer is changed to the source identifier of the received MAC PDU, so the default radio bearer becomes a non default radio bearer. The MAC layer entity 215 transmits the MAC SDU(s) included in the MAC PDU to the RLC layer entity 213 corresponding to the non default radio bearer.

b) If the non default radio bearer, i.e., a radio bearer which is not associated with the null source identifier is already established for a data reception, and if the source identifier of the received MAC PDU is different from a source identifier of existing radio bearer for a data reception, the MAC layer entity 215 triggers release of the existing radio bearer, and establishment of a new radio bearer, and identifies the establishment of the new radio bearer using the source identifier included in the received MAC PDU.

Alternatively, if the non default radio bearer for the data reception is already established, and if the source identifier of the received MAC PDU is different from the source identifier of an existing radio bearer for a data reception, and has preference higher than preference of the source identifier of the existing radio bearer/for the data reception, the MAC layer entity 215 triggers release of the existing radio bearer for the data reception and establishment of a new radio bearer for a data reception, and identifies the new radio bearer for the data reception using the source identifier of the received MAC PDU.

Alternatively, if the non default radio bearer for the data reception is already established, and if the source identifier of the received MAC PDU is different from the source identifier of the existing radio bearer for the data reception, and has preference higher than preference of the source identifier of the existing radio bearer for the data reception, the MAC layer entity 215 triggers release of the existing radio bearer for the data reception, and establishment of a new radio bearer for data reception, and identifies the new radio bearer for the data reception using the source identifier of the received MAC PDU.

Here, a service indicator may be included in the MAC PDU, or a service priority may be included in the MAC PDU. For example, the service indicator indicates whether a related service is a voice service or a data service. The MAC layer entity 215 transmits the MAC SDU(s) included in the MAC PDU to the RLC layer entity 213 corresponding to the new radio bearer.

c) If a non default radio bearer is already established for a data reception, and if the source identifier of the received MAC PDU is identical to a source identifier of an existing radio bearer for a data reception, the MAC layer entity 215 transmits the MAC SDUs included in the MAC PDU to the RLC layer entity 213 corresponding to a related radio bearer.

Meanwhile, if there is no activity for a pre-defined time period, the non default radio bearer for the data reception are released, and a default radio bearer is established with default configuration. The established default and non default radio bearer for the data reception are released if the upper layer entity indicates to stop monitoring D2D communication.

A user plane protocol stack configuration scheme #1 for a data reception which is based on the second implementation scheme has been described above, and a user plane protocol stack configuration scheme #1 for a data reception which is based on the third implementation scheme will be described below.

A UE may receive data from a plurality of UEs concurrently. The UE which receives the data maintains one or more radio bearers (i.e. PDCP layer entities and RLC layer entities) for a data reception. Here, each radio bearer (i.e. a PDCP layer entity and a RLC layer entity) is for receiving data from a different UE. The user plane protocol stack includes one PDCP layer entity, one RLC layer entity per radio bearer, and one MAC layer entity. The radio bearer, i.e., a PDCP layer entity and a RLC layer entity are identified by a UE ID of a UE from which the UE receives the data.

Another example of a structure of a user plane protocol stack for a data transmission and reception which is based on a user plane protocol stack configuration scheme #1 in a connectionless communication system according to an embodiment of the present disclosure will be described with reference to FIG. 3.

Figure 3:
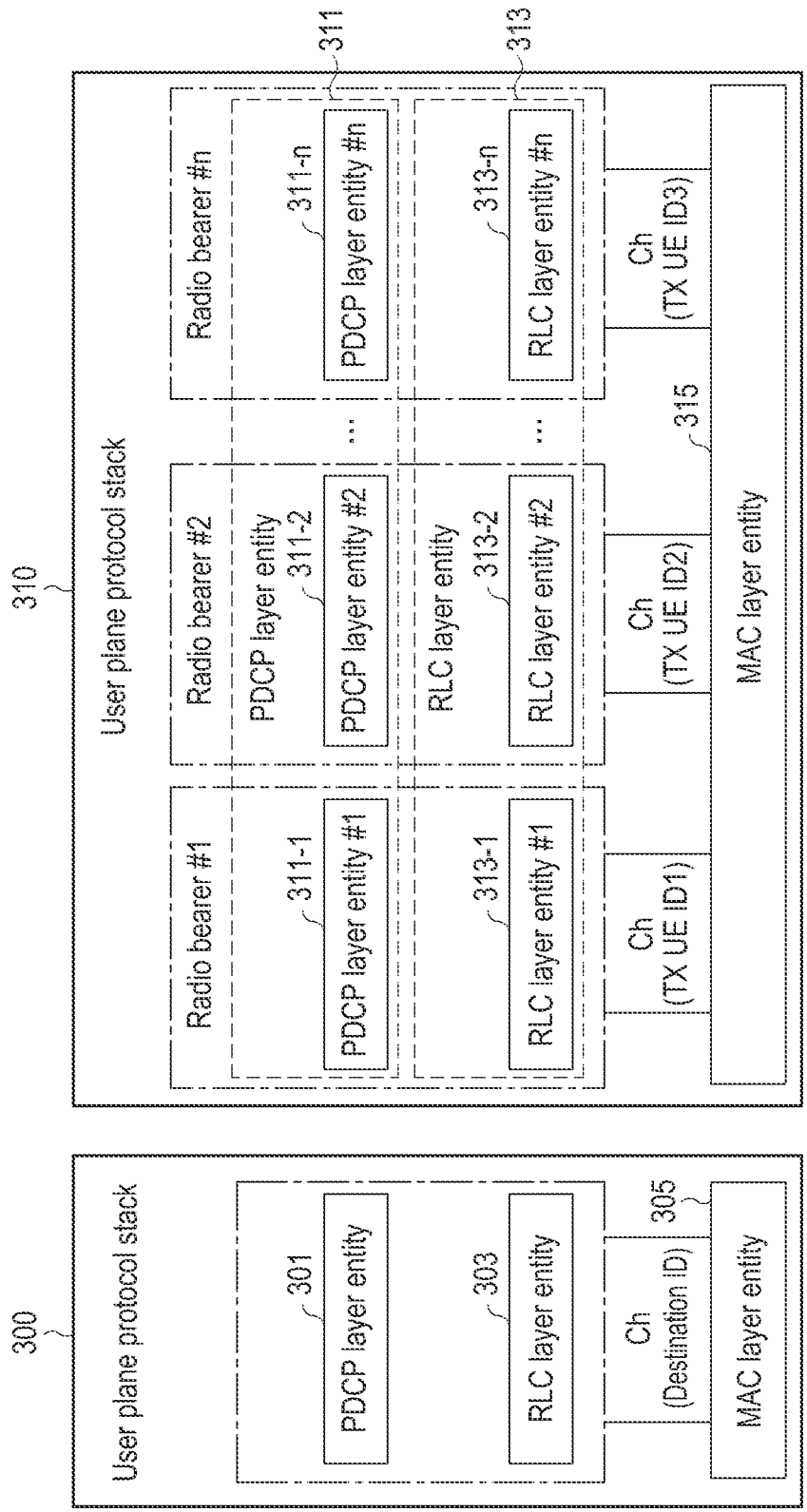
FIG. 3 schematically illustrates another example of a structure of a user plane protocol stack for a data transmission and which is based on a user plane protocol stack configuration scheme #1 in a connectionless communication system according to an embodiment of the present disclosure.

FIG. 3 schematically illustrates another example of a structure of a user plane protocol stack for data transmission and reception which is based on a user plane protocol stack configuration scheme #1 in a connectionless communication system according to an embodiment of the present disclosure.

Referring to FIG. 3, it will be noted that a user plane protocol stack 310 in FIG. 3 is a user plane protocol stack including a plurality of RX radio bearers, i.e. plurality of PDCP layer entities 311 and a plurality of RLC layer entities 313.

The user plane protocol stack 300 for data transmission includes a PDCP layer entity 301, a RLC layer entity 303 and a MAC layer entity 305. The PDCP layer entity 301 and the RLC layer entity 303 are identified by a destination ID.

The user plane protocol stack 310 for data reception includes a PDCP layer entity #1 311-1 and a RLC layer entity #1 313-1 corresponding to a first radio bearer #1, includes a PDCP layer entity #2 311-2 and a RLC layer entity #2 313-2 corresponding to a second radio bearer #2, and so on. The user plane protocol stack 310 for data reception also includes a MAC layer entity 315 which is common across all of the radio bearers. The PDCP layer entities 311 and the RLC layer entities 313 are identified by a source identifier.

A user plane protocol stack configuration scheme #1 for a data reception which is based on the third implementation scheme will be described below.

1) Filtering by a physical layer entity using a destination identifier in a scheduling assignment:

This is same as explained in the first implementation scheme of the user plane protocol stack configuration scheme #1 for a data reception, so a detailed description will be omitted herein.

2) Filtering by the MAC layer entity 315 using a destination identifier in a MAC PDU:

This is same as explained in the first implementation scheme of the user plane protocol stack configuration scheme #1 for a data reception, so a detailed description will be omitted herein.

3) Determination of a source identifier and Filtering by the MAC layer entity 315 using a source identifier:

This is same as explained in the first implementation scheme of the user plane protocol stack configuration scheme #1 for a data reception, so a detailed description will be omitted herein.

4) The MAC layer entity 315 in the UE determines whether there is a radio bearer (i.e. a PDCP layer entity and a RLC layer entity) for a data reception corresponding to the source identifier, i.e. a UE ID of a UE from which UE has received the MAC PDU.

a) If a radio bearer (i.e. a PDCP layer entity and a RLC layer entity) for data reception is not already established or created then, the MAC layer entity 315 triggers creation of a new radio bearer (i.e. a PDCP layer entity and a RLC layer entity), and identifies the new radio bearer (i.e. the PDCP layer entity and the RLC layer entity) for the data reception using a source identifier of the received MAC PDU. The MAC layer entity 315 transmits MAC SDUs included in the MAC PDU to the RLC layer entity 313 corresponding to the new radio bearer. If the new radio bearer is established, the PDCP layer entity 311 and the RLC layer entity 313 are configured using default (or pre-configured) values.

b) If a radio bearer (i.e. a PDCP layer entity and a RLC layer entity) is already established, and if the source identifier of the received MAC PDU is different from a source identifier of an existing radio bearer (i.e. a PDCP layer entity and a RLC layer entity), the MAC layer entity 315 triggers establishment of a new radio bearer (i.e. a PDCP layer entity and a RLC layer entity), and identifies the new radio bearer (i.e. the PDCP layer entity and the RLC layer entity) using a source identifier of the received MAC PDU. The MAC layer entity 315 transmits the MAC SDU(s) included in the MAC PDU to the RLC layer entity 313 corresponding to the new radio bearer.

c) If a radio bearer (i.e. a PDCP layer entity and a RLC layer entity) is already established, and if the source identifier of the received MAC PDU is identical to the source identifier of the existing radio bearer (i.e. a PDCP layer entity and a RLC layer entity), the MAC layer entity 315 transmits the MAC SDU(s) included in the MAC PDU to the RLC layer entity 313 corresponding to a related radio bearer.

If there is no activity for a pre-defined time period, the radio bearer for the data reception is released.

Meanwhile, if a voice service is received from one TX UE, the MAC layer entity 315 may not establish a radio bearer with another TX UE for a voice service. Alternatively, the MAC layer entity 315 may release an old voice service, and generate a new radio bearer for a voice service with a new TX UE. Here, the new radio bearer (i.e. a PDCP layer entity and a RLC layer entity) may be generated based on TX UE preference. The MAC layer entity 315 may identify a voice service using some indicator in a MAC PDU. Alternatively, maintenance for one voice service may be processed in a upper layer entity. If the voice service is received from one TX UE, voice packets from another TX UE may be discarded by the upper layer entity.

A user plane protocol stack configuration scheme #1 for a data reception which is based on the third implementation scheme has been described above, and a user plane protocol stack configuration scheme #1 for a data reception which is based on the fourth implementation scheme will be described below.

A UE may receive data from a plurality of UEs concurrently. The UE which receives the data maintains one or more radio bearers (i.e. PDCP layer entities and RLC layer entities) for a data reception. Here, each radio bearer is for receiving data from a different UE. In this case, the user plane protocol stack includes one PDCP layer entity, one RLC layer entity per radio bearer, and one MAC layer entity. The radio bearer, i.e., a PDCP layer entity and a RLC layer entity are identified by a source identifier, i.e. UE ID of a UE from which the UE receives the data. Here, the user plane protocol stack is identical to a user plane protocol stack illustrated in FIG. 3, so a detailed description will be omitted herein.

A UE establishes a default radio bearer (i.e. a PDCP layer entity and a RLC layer entity) using default configuration if a upper layer entity triggers to monitor D2D communication. The established default radio bearer (i.e. the PDCP layer entity and the RLC layer entity) is not associated with a source identifier, and a source identifier corresponding to the established default radio bearer is null.

An operating process of a UE in the user plane protocol stack configuration scheme #1 for the data reception which is based on the fourth implementation scheme will be described below.

1) Filtering by a physical layer entity using a destination identifier in a scheduling assignment:

This is same as explained in the first implementation scheme of the user plane protocol stack configuration scheme #1 for a data reception, so a detailed description will be omitted herein.

2) Filtering by a MAC layer entity using a destination identifier in a MAC PDU:

This is same as explained in the first implementation scheme of the user plane protocol stack configuration scheme #1 for a data reception, so a detailed description will be omitted herein.

3) Determination of a source identifier and Filtering by a MAC layer entity using a source identifier:

This is same as explained in the first implementation scheme of the user plane protocol stack configuration scheme #1 for a data reception, so a detailed description will be omitted herein.

4) The MAC layer entity 315 determines whether there is a radio bearer (i.e. a PDCP layer entity and a RLC layer entity) for a data reception corresponding to the source identifier, i.e. a UE ID of a UE from which a UE has received the MAC PDU.

a) If there is no radio bearer (i.e. a PDCP layer entity and a RLC layer entity) which is already established other than the default radio bearer, the MAC layer entity 315 uses the default radio bearer. The null source identifier of the default radio bearer is changed to a source identifier received in the MAC PDU. The MAC layer entity 315 transmits the MAC SDU(s) included in the MAC PDU to the RLC layer entity 313 corresponding to the radio bearer. The MAC layer entity 315 triggers generation of a new default radio bearer.

b) If a non default radio bearer is already established, and if the source identifier of the received MAC PDU is different from a source identifier of an existing radio bearer, the MAC layer entity 315 uses the default radio bearer. The null source identifier of the default radio bearer is changed to the source identifier received through the MAC PDU. The MAC layer entity 315 transmits the MAC SDU(s) included in the received MAC PDU to the RLC layer entity 313 corresponding to the radio bearer. The MAC layer entity 315 triggers generation of a new default radio bearer.

c) If a non default radio bearer is already established, and if the source identifier of the received MAC PDU is identical to a source identifier of an existing radio bearer, the MAC layer entity 315 transmits the MAC SDU(s) included in the MAC PDU to RLC layer entity corresponding to this radio bearer.

If there is no activity for a pre-defined time period, the radio bearer for the data reception is released. The default radio bearer and the non default radio bearer which are established for the data reception are released if the upper layer entity indicates to stop monitoring D2D communication.

In this embodiment, if a voice service is received from one TX UE, the MAC layer entity 315 may not establish a radio bearer with another TX UE for a voice service. Alternatively, the MAC layer entity 315 may release an old voice service, and generate a new radio bearer for a voice service with a new TX UE. Here, the new radio bearer may be generated based on TX UE preference. The MAC layer entity 315 may identify a voice service using some indicator in a MAC PDU. Alternatively, maintenance for one voice service may be processed in a upper layer entity. If the voice service is received from one TX UE, voice packets from another TX UE may be discarded by the upper layer entity.

As described above, in a user plane protocol stack configuration scheme #1 for a data reception which is based on each of the first implementation scheme to the fourth implementation scheme, a MAC layer entity may indicate a RRC layer entity to create/release a radio bearer (i.e. a PDCP layer entity and a RLC layer entity), or may create/release a new radio bearer (i.e. a PDCP layer entity and a RLC layer entity).

A user plane protocol stack configuration scheme #1 has been described above, and a user plane protocol stack configuration scheme #2 will be described below.

A user plane protocol stack configuration scheme #2 for a data transmission in a D2D communication system will be described below.

A UE which transmit data to one or more UEs maintains a plurality of radio bearers for D2D data transmission. Each radio bearer refers to a set of one PDCP layer entity and one RLC layer entity. Here, one radio bearer is for one destination. For example, radio bearers for broadcast, unicast and group cast may be different. For the group cast, a radio bearer for a different group is different. Similarly, for the unicast, a radio bearer for different UEs is different. The radio bearer is mapped to one logical channel, and the logical channel is mapped to a D2D communication transport channel which is mapped to a D2D communication broadcast physical channel.

In the UE, a radio bearer (i.e. a PDCP layer entity and a RLC layer entity) for a data transmission is created/established if a upper layer entity triggers a data transmission. The upper layer entity may be a ProSe Protocol entity or a Application Protocol entity. Further, a PDCP layer entity and a RLC layer entity are created/established and configured using default values.

The upper layer entity may indicate whether the data transmission in the UE is a broadcast transmission, a unicast transmission, or a group cast transmission. That is, the upper layer entity may indicate the data transmission in the UE is the broadcast transmission, the unicast transmission, or the group cast transmission by transmitting information which indicates that the data transmission in the UE is the broadcast transmission, the unicast transmission, or the group cast transmission. If the data transmission is the unicast transmission then upper layer entity provides the destination UE ID. If the data transmission is the groupcast transmission, then upper layer provides the destination Group ID The UE ID of the UE may also be provided by the upper layer entity.

The created/established radio bearer (i.e the PDCP layer entity and the RLC layer entity) is removed if the upper layer entity stops the data transmission corresponding to the destination associated with that radio bearer. The generated radio bearer (i.e. the PDCP layer entity and the RLC layer entity) may be removed by the RRC layer entity of the MAC layer entity in one system.

A priority may be assigned to a radio bearer based on a destination (for example, unicast may have a priority higher than a priority of broadcast) or a type of a service (for example, a voice service may have a priority higher than a priority of a data service). In the UE, a radio bearer established for a data transmission is released if the upper layer triggers to release the radio bearer established for the data transmission.

The radio bearers (i.e PDCP layer entities and RLC layer entities) may be identified as one of an option A and an option B.

(1) Option A: destination ID (a group ID, a unicast ID (i.e. a UE ID), or a broadcast ID) based (2) Option B: LCID based. An LCID is local to a transmitting UE, and assignment of an LCID for a radio bearer is maintained by the transmitting UE. If the LCID is used to identify radio bearers for a data transmission, the UE includes the LCID into a MAC header of the MAC PDU.

During the data transmission the PDCP layer entity processes (i.e. applies security and/or header compression and/or sequence numbering to the packets) the packets received from upper layer and sends to the RLC layer entity. The RLC layer entity processes (applies sequence numbering and/or fragmentation) these packets (i.e. RLC SDUs) and sends them to the MAC layer entity. The MAC layer entity transmits one or more of these packets (i.e. MAC SDUs) corresponding to the same destination ID in the MAC PDU.

During the data transmission, a source identifier and a destination identifier are transmitted by the UE and the scheme of transmitting them is same as described in the user plane protocol stack configuration scheme #1, so a detailed description will be omitted herein.

A user plane protocol stack configuration scheme #2 for a data transmission has been described above, and a user plane protocol stack configuration scheme #2 for a data reception will be described below.

The user plane protocol stack configuration scheme #2 for the data reception is based on one of the first implementation scheme to the fourth implementation scheme, and the user plane protocol stack configuration scheme #2 for the data reception which is based on each of the first implementation scheme to the fourth implementation scheme will be described below.

Firstly, a user plane protocol stack configuration scheme #2 for a data reception which is based on the first implementation scheme will be described below.

A UE receives data from one TX UE at a time. The UE maintains one or more radio bearers for a data reception. Each of the radio bearers exists for a data reception from the same UE. A user plane protocol stack includes one PDCP layer entity per radio bearer, one RLC layer entity per radio bearer, and one MAC layer entity. The radio bearer, i.e., a PDCP layer entity and a RLC layer entity are identified by a pair of a source identifier i.e. UE ID of a UE from which UE receives data and a destination ID or LCID, i.e., a <TX UE ID, destination ID or LCID>.

An example of a structure of a user plane protocol stack for data transmission and reception which is based on a user plane protocol stack configuration scheme #2 in a connectionless communication system according to an embodiment of the present disclosure will be described with reference to FIG. 4.

Figure 4:
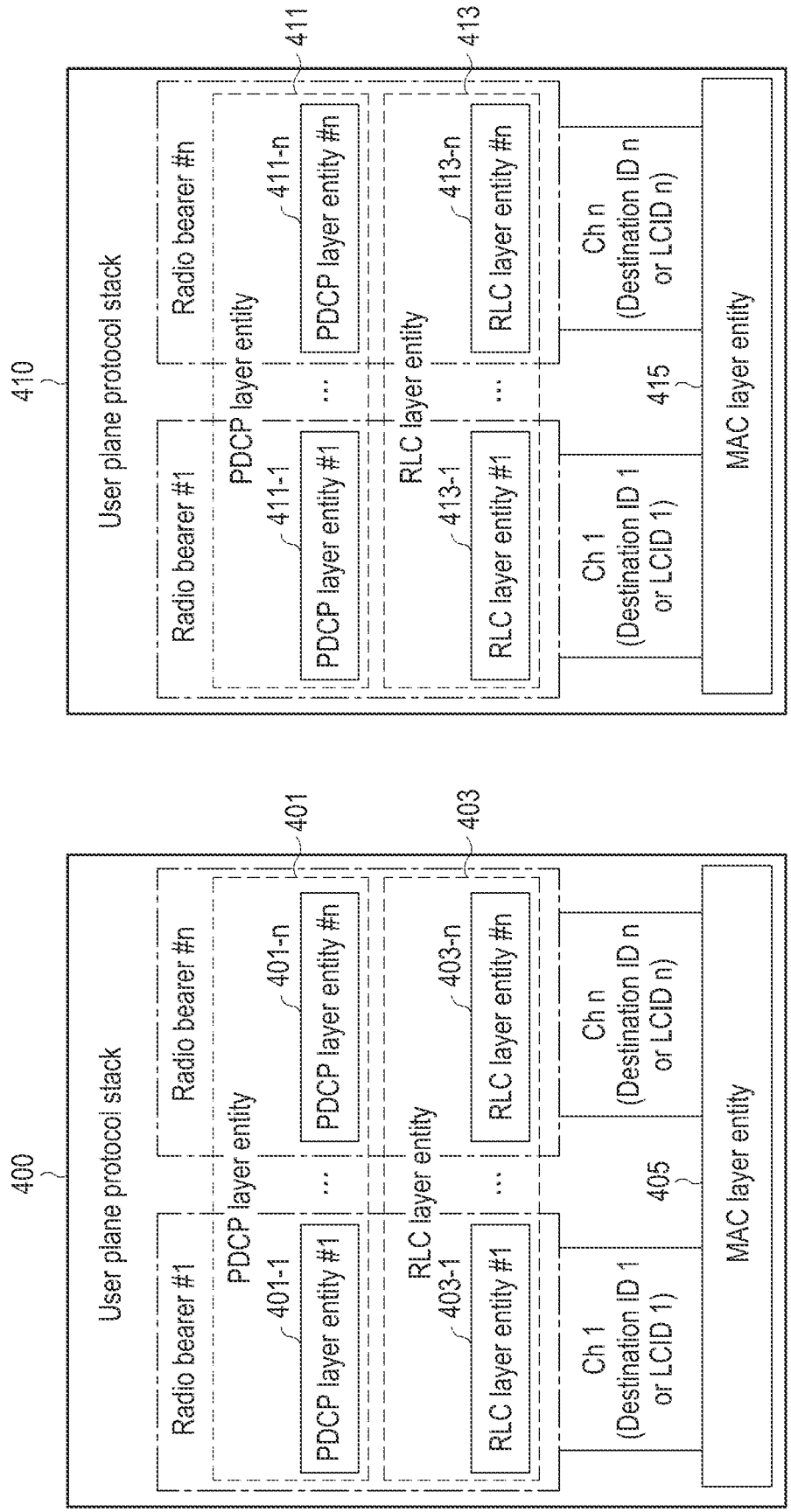
FIG. 4 schematically illustrates an example of a structure of a user plane protocol stack for a data transmission and reception which is based on a user plane protocol stack configuration scheme #2 in a connectionless communication system according to an embodiment of the present disclosure.

FIG. 4 schematically illustrates an example of a structure of a user plane protocol stack for a data transmission and reception which is based on a user plane protocol stack configuration scheme #2 in a connectionless communication system according to an embodiment of the present disclosure.

Referring to FIG. 4, it will be noted that a user plane protocol stack 400 in FIG. 4 is a user plane protocol stack for data transmission including a plurality of TX radio bearers, i.e. a plurality of PDCP layer entities 401 and a plurality of RLC layer entities 403, and a user plane protocol stack 410 in FIG. 4 is a user plane protocol stack for data reception including a plurality of RX radio bearers, i.e. a plurality of PDCP layer entities 411 and a plurality of RLC layer entities 413.

The user plane protocol stack 400 for data transmission includes a PDCP layer entity #1 401-1 and a RLC layer entity #1 403-1 corresponding to a first radio bearer #1, includes a PDCP layer entity #2 401-2 and a RLC layer entity #2 403-2 corresponding to a second radio bearer #2, and so on. The user plane protocol stack 400 for data transmission also includes a MAC layer entity 405 which is common across all of the radio bearers. The PDCP layer entity 401 and the RLC layer entity 403 are identified by a destination ID or a LCID.

The user plane protocol stack 410 for data reception includes a PDCP layer entity #1 411-1 and a RLC layer entity #1 413-1 corresponding to a first radio bearer #1, includes a PDCP layer entity #2 411-2 and a RLC layer entity #2 413-2 corresponding to a second radio bearer #2, and so on. The user plane protocol stack 410 for data reception also includes a MAC layer entity 415 which is common across all of the radio bearers. The PDCP layer entity 411 and RLC layer entity 413 are identified by a source identifier and one of a destination ID or a LCID. The user plane protocol stack configuration scheme #2 for the data reception which is based on the first implementation scheme will be described below.

1) Filtering by a physical layer entity using destination identifier in a scheduling assignment:

This is same as explained in the first implementation scheme of the user plane protocol stack configuration scheme #1 for a data reception, so a detailed description will be omitted herein. The destination identifier is transmitted to the MAC layer entity 415 along with MAC PDU.

2) Filtering by the MAC layer entity 415 using a destination identifier in a MAC PDU:

This is same as explained in the first implementation scheme of the user plane protocol stack configuration scheme #1 for a data reception, so a detailed description will be omitted herein.

3) Determination of a source identifier and Filtering by the MAC layer entity 415 using a source identifier:

This is same as explained in the first implementation scheme of the user plane protocol stack configuration scheme #1 for a data reception, so a detailed description will be omitted herein.

4) The MAC layer entity 415 in the UE determines a destination ID or an LCID of the MAC SDU(s) in the received MAC PDU. The destination ID or the LCID may be determined by reading the destination ID or the LCID from a MAC header of the MAC PDU. In case one part of the destination ID is transmitted in a destination identifier field in the MAC header of the MAC PDU and another part of the destination ID is transmitted in scheduling assignment information, the MAC layer entity 415 determines the destination ID by combining both of the parts of the destination ID.

5) For each MAC SDU received in the MAC PDU, the MAC layer entity 415 in the UE determines whether there is a radio bearer (i.e. a PDCP layer entity and a RLC layer entity) for a data reception.

a) If there is no radio bearer (i.e. a PDCP layer entity and a RLC layer entity) which is already established for a data reception, the MAC layer entity 415 triggers a creation/establishment of a new radio bearer (i.e. a PDCP layer entity and a RLC layer entity), and identifies the new radio bearer (i.e. the PDCP layer entity and the RLC layer entity) for the data reception using a <source identifier, destination ID/LCID> of the MAC SDU received in the MAC PDU. The MAC layer entity 415 transmits the MAC SDU to the RLC layer entity 413 corresponding to the new radio bearer. If the new radio bearer (i.e. the PDCP layer entity and the RLC layer entity) is established, the PDCP layer entity 411 and the RLC layer entity 413 are configured using default (or pre-configured) values.

b) If a radio bearer (i.e. a PDCP layer entity and a RLC layer entity) is already established, and if the source identifier of the MAC SDU received in the MAC PDU is different from source identifiers of existing radio bearers (i.e. PDCP layer entities and RLC layer entities), the MAC layer entity 415 triggers release of the existing radio bearers, and establishment of a new radio bearer, and identifies the new radio bearer using the <source identifier, destination ID/LCID> of the MAC SDU. The MAC layer entity 415 transmits the MAC SDU to the RLC layer entity 413 corresponding to the new radio bearer.

c) If a radio bearer is already established, and if the source identifier of the MAC SDU received in the MAC PDU is identical to a source identifier of an existing radio bearer, and a destination ID or an LCID of the MAC SDU is identical to a destination ID or an LCID of the existing radio bearer, the MAC layer entity 415 transmits the MAC SDU to the RLC layer entity 413 corresponding to the existing radio bearer.

d) If a radio bearer is already established, and if the source identifier of the MAC SDU received in the MAC PDU is identical to the source identifier of the existing radio bearer, and a destination ID or an LCID of the MAC PDU is different from a destination ID or an LCID of the existing radio bearer, the MAC layer entity 415 triggers establishment of a new radio bearer, and transmits the MAC SDU to the RLC layer entity 413 corresponding to the new radio bearer.

If there is no activity for a pre-defined time period, the radio bearer for the data reception is released. The established radio bearer for the data reception is released if the upper layer entity indicates to stop monitoring D2D communication.

A user plane protocol stack configuration scheme #2 for a data reception which is based on the first implementation scheme has been described above, and a user plane protocol stack configuration scheme #2 for a data reception which is based on the second implementation scheme will be described below.

A UE receives data from one TX UE at a time. The UE maintains one or more radio bearers for a data reception. Here, each radio bearer is for a data reception from the same UE. A user plane protocol stack includes one PDCP layer entity, one RLC layer entity per radio bearer, and one MAC layer entity. The radio bearer, i.e., the PDCP layer entity and the RLC layer entity are identified by a <source identifier, i.e. UE ID of a UE from which the UE receives the data, destination ID/LCID>. Here, the user plane protocol stack is identical to a user plane protocol stack illustrated in FIG. 4, so a detailed description will be omitted herein.

In this case, a UE establishes a default radio bearer using default configuration if the upper layer entity triggers to monitor D2D communication. The established default radio bearer is identified by a <Source Identifier=null, destination ID/LCID=null>. The UE may also establish a plurality of default radio bearers, one for broadcast, one for unicast and one or more for associated groups of the UE.

An operating process of a UE in a user plane protocol stack configuration scheme #2 for a data reception which is based on the second implementation scheme will be described below.

1) Filtering by a physical layer entity using a destination identifier in a scheduling assignment:

This is same as explained in the first implementation scheme of the user plane protocol stack configuration scheme #1 for a data reception, so a detailed description will be omitted herein. The destination identifier is transmitted to the MAC layer entity 415 along with the MAC PDU.

2) Filtering by the MAC layer entity 415 using a destination identifier in a MAC PDU:

This is same as explained in the first implementation scheme of the user plane protocol stack configuration scheme #1 for a data reception, so a detailed description will be omitted herein.

3) Determination of a source identifier and Filtering by the MAC layer entity 415 using a source identifier:

This is same as explained in the first implementation scheme of the user plane protocol stack configuration scheme #1 for a data reception, so a detailed description will be omitted herein.

4) The MAC layer entity 415 in the UE determines a destination ID or an LCID of MAC SDU(s) received in the MAC PDU. The destination ID or the LCID may be determined by reading the destination ID or the LCID from a MAC header of the MAC PDU. In case one part of the destination ID is transmitted in a destination identifier field in the MAC header of the MAC PDU and another part of the destination ID is transmitted in scheduling assignment information, the MAC layer entity 415 determines the destination ID by combining both of the parts of the destination ID.

5) For each MAC SDU received in the MAC PDU, the MAC layer entity 415 in the UE determines whether there is a radio bearer (i.e. a PDCP layer entity and a RLC layer entity) for a data reception.

a) If there is no radio bearer (i.e. a PDCP layer entity and a RLC layer entity) which is already established for a data reception except default radio bearer(s), the MAC layer entity 415 uses the default radio bearer or a default radio bearer corresponding to the destination ID. The <source identifier=null, destination ID/LCID=null> is changed to a <source identifier, destination ID/LCID> corresponding to the MAC SDU received in the MAC PDU, so the radio bearer becomes a non default radio bearer. The MAC layer entity 415 transmits the MAC SDU to the RLC layer entity 413 corresponding to the radio bearer. The MAC layer entity 415 triggers generation of a new default radio bearer.

b) If a non default radio bearer is already established, and if the source identifier of the MAC SDU is different from a source identifier of each of the existing radio bearers, the MAC layer entity 415 triggers release of the existing radio bearers, and establishment of a new radio bearer, and identifies the new radio bearer using the <source identifier, destination ID/LCID> of the MAC SDU. The MAC layer entity 415 transmits the MAC SDU to the RLC layer entity 413 corresponding to the new radio bearer.

c) If non default radio bearer is already established, and if the source identifier included in the MAC SDU is identical to the source identifier of the existing radio bearer, and a destination ID or an LCID of the MAC SDU is identical to a destination ID or an LCID of the existing radio bearer, the MAC layer entity 415 transmits the MAC SDU to the RLC layer entity 413 corresponding to the existing radio bearer.

d) If a non default radio bearer are already established, and if the source identifier of the MAC SDU received in the MAC PDU is identical to the source identifier of the existing radio bearer, and a destination ID or an LCID of the MAC SDU is different from the destination ID or the LCID of the existing radio bearer, the MAC layer entity 415 uses the default radio bearer or a default radio bearer corresponding to the destination ID. The <source identifier=null, destination ID/LCID=null> is changed to the <source identifier, destination ID/LCID> corresponding to the MAC SDU, so the radio bearer becomes a non default radio bearer. The MAC layer entity 415 transmits the MAC SDU to the RLC layer entity 413 corresponding to the radio bearer. The MAC layer entity 415 also triggers generation of a new default radio bearer.

If there is no activity for a pre-defined time period, the radio bearer for the data reception is released. The established default or non default radio bearer for the data reception is released if the upper layer entity indicates to stop monitoring D2D communication.

A user plane protocol stack configuration scheme #2 for a data reception which is based on the second implementation scheme has been described above, and a user plane protocol stack configuration scheme #2 for a data reception which is based on the third implementation scheme will be described below.

A UE may receive data from a plurality of TX UEs concurrently. The UE maintains one or more radio bearers for a data reception. Each radio bearer is for a data reception from a different <source identifier, destination ID/LCID>.

Another example of a structure of a user plane protocol stack for a data reception which is based on a user plane protocol stack configuration scheme #2 in a connectionless communication system according to an embodiment of the present disclosure will be described with reference to FIGS. 5A and 5B.

Figure 5A:
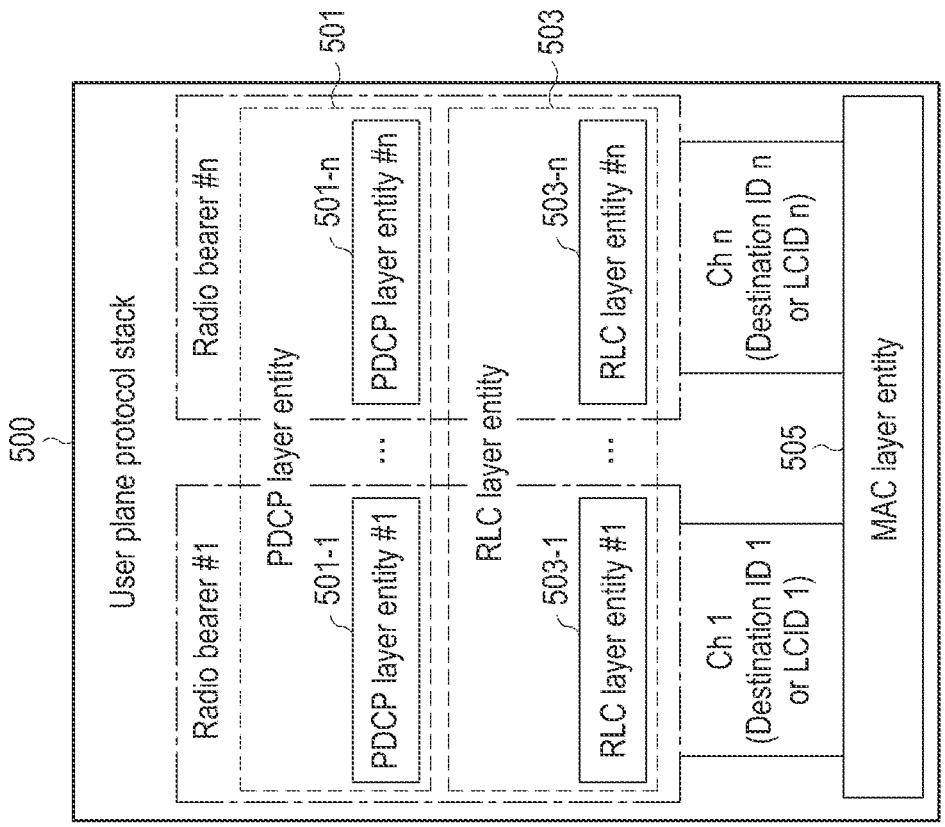
FIGS. 5A and 5B schematically illustrate another example of a structure of a user plane protocol stack for data transmission and reception which is based on a user plane protocol stack configuration scheme #2 in a connectionless communication system according to an embodiment of the present disclosure.
Figure 5B:
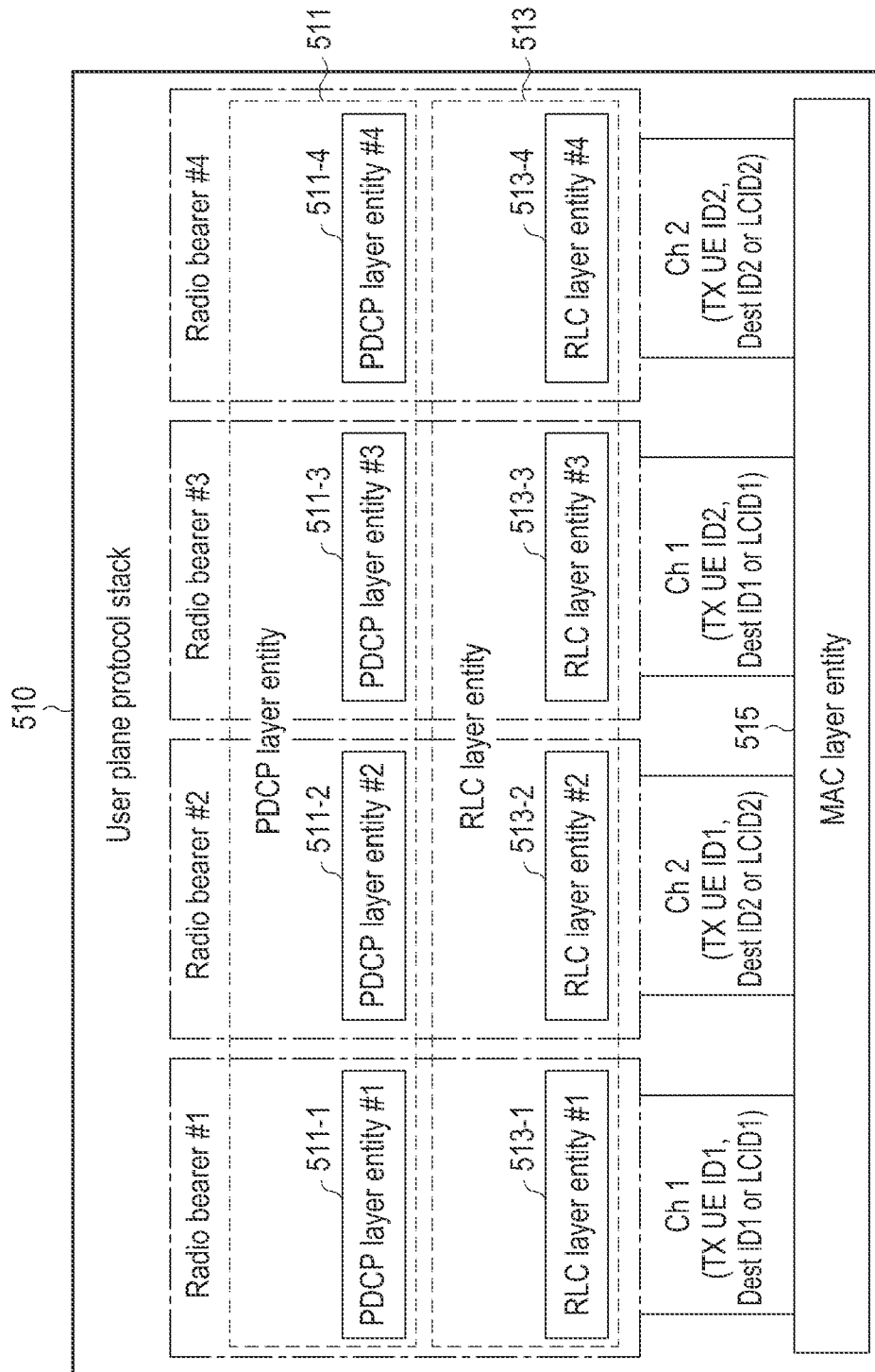

FIGS. 5A and 5B schematically illustrate another example of a structure of a user plane protocol stack for data transmission and reception which is based on a user plane protocol stack configuration scheme #2 in a connectionless communication system according to an embodiment of the present disclosure.

FIG. 5A is a user plane protocol stack 500 for data transmission including a plurality of TX radio bearers, i.e. a plurality of PDCP layer entities 501 and a plurality of RLC layer entities 503, and a user plane protocol stack 510 in FIG. 5B is a user plane protocol stack for data reception including a plurality of RX radio bearers, i.e. a plurality of PDCP layer entities 511 and a plurality of RLC layer entities 513.

The user plane protocol stack 500 for data transmission includes a PDCP layer entity #1 501-1 and a RLC layer entity #1 503-1 corresponding to a first radio bearer #1, includes PDCP layer entity #n 501-n and a RLC layer entity #2 503-n corresponding to a n-th radio bearer #n, and so on. The user plane protocol stack 500 for data transmission also includes a MAC layer entity 505 which is common across all of the radio bearers. The PDCP layer entity 501 and the RLC layer entity 503 are identified by a destination ID or a LCID.

The user plane protocol stack 510 for data reception includes a PDCP layer entity #1 511-1 and a RLC layer entity #1 513-1 corresponding to a first radio bearer #1, includes a PDCP layer entity #2 511-2 and a RLC layer entity #2 513-2 corresponding to a second radio bearer #2, and so on. The user plane protocol stack 510 for data reception also includes a MAC layer entity 515 which is common across all of the radio bearers. Each of the PDCP layer entities 511 and the RLC layer entities 513 are identified by a source identifier and one of a destination ID and a LCID.

An operating process of a UE in a user plane protocol stack configuration scheme #2 for a data reception which is based on the third implementation scheme will be described below.

1) Filtering by a physical layer entity using destination identifier in a scheduling assignment:

This is same as explained in the first implementation scheme of the user plane protocol stack configuration scheme #1 for a data reception, so a detailed description will be omitted herein. The destination identifier is transmitted to the MAC layer entity 515 along with MAC PDU.

2) Filtering by the MAC layer entity 515 using a destination identifier in a MAC PDU:

This is same as explained in the first implementation scheme of the user plane protocol stack configuration scheme #1 for a data reception, so a detailed description will be omitted herein.

3) Determination of a source identifier and Filtering by the MAC layer entity 515 using a source identifier:

This is same as explained in the first implementation scheme of the user plane protocol stack configuration scheme #1 for a data reception, so a detailed description will be omitted herein.

4) The MAC layer entity 515 determines a destination ID or an LCID of one or more MAC SDUs received in the MAC PDU. The destination ID or the LCID may be determined by reading the destination ID or the LCID from a MAC header of the MAC PDU. In case one part of the destination ID is transmitted in a destination identifier field in the MAC header of the MAC PDU and another part of the destination ID is transmitted in scheduling assignment information, the MAC layer entity 515 determines the destination ID by combining both of the parts of the destination ID.

5) For each MAC SDU(s) received in the MAC PDU, the MAC layer entity 515 in the UE determines whether there is a radio bearer (i.e. a PDCP layer entity and a RLC layer entity) for a data reception.

a) If there is no radio bearer (i.e. a PDCP layer entity and a RLC layer entity) which is already established for a data reception, the MAC layer entity 515 triggers a creation/establishment of a new radio bearer (i.e. a PDCP layer entity and a RLC layer entity), and identifies the new radio bearer for the data reception using a <source identifier, destination ID/LCID> of the MAC SDU received in the MAC PDU. The MAC layer entity 515 transmits the MAC SDU to the RLC layer entity 513 corresponding to the new radio bearer. If the new radio bearer is established, the PDCP layer entities 511 and the RLC layer entities 513 are configured using default (or pre-configured) values.

b) If a radio bearer (i.e. a PDCP layer entity and a RLC layer entity) is already established, and if the <source identifier, destination ID/LCID> of the MAC SDU received in the MAC PDU is different from a <source identifier, destination ID/LCID> of each of existing radio bearers, the MAC layer entity 515 triggers establishment of a new radio bearer, and identifies the new radio bearer using the <source identifier, destination ID or LCID> of the MAC SDU. The MAC layer entity 515 transmits the MAC SDU to the RLC layer entity 513 corresponding to the new radio bearer.

c) If a radio bearer is already established, and if the <source identifier, destination ID/LCID> included in the MAC SDU received in the MAC PDU is identical to a <source identifier, destination ID/LCID> of an existing radio bearer, the MAC layer entity 515 transmits the MAC SDU to the RLC layer entity 513 corresponding to the existing radio bearer.

If there is no activity for a pre-defined time period, the radio bearer is released. The established radio bearer for the data reception is released if the upper layer entity indicates to stop monitoring D2D communication.

Meanwhile, if voice service data is received from one TX UE, the MAC layer entity 515 may not establish a radio bearer/logical channel with another TX UE for a voice service. Alternatively, the UE may release an old voice service, and generate a radio bearer for a voice service with a new TX UE. Here, the radio bearer with the new TX UE may be generated based on TX UE preference. The UE may identify a voice service using some indicator included in a MAC PDU.

Alternatively, maintenance for a voice service may be processed in the upper layer entity. If the voice service is received from one TX UE, voice service packets from another TX UE may be discarded by the upper layer entity.

A user plane protocol stack configuration scheme #2 for a data reception which is based on the third implementation scheme has been described above, and a user plane protocol stack configuration scheme #2 for a data reception which is based on the fourth implementation scheme will be described below.

A UE may receive data from a plurality of UEs concurrently. The UE which receives the data maintains one or more radio bearers for a data reception. Here, each radio bearer is for receiving data from a different <source identifier, destination ID/LCID>. Here, the user plane protocol stack is identical to a user plane protocol stack illustrated in FIGS. 5A and 5B, so a detailed description will be omitted herein.

In this case, a UE establishes a default radio bearer using default configuration if the upper layer entity triggers to monitor D2D communication. The established default radio bearer is identified by a <source identifier=null, destination ID/LCID=null>. The UE may also establish a plurality of default radio bearers, one for broadcast, one for unicast and one or more for associated groups of the UE.

An operating process of a UE in a user plane protocol stack configuration scheme #2 for a data reception which is based on the fourth implementation scheme will be described below.

1) Filtering by a physical layer entity using a destination identifier in a scheduling assignment:

This is same as explained in the first implementation scheme of the user plane protocol stack configuration scheme #1 for a data reception, so a detailed description will be omitted herein. The destination identifier is transmitted to the MAC layer entity 515 along with the MAC PDU.

2) Filtering by the MAC layer entity 515 using a destination identifier in the MAC PDU:

This is same as explained in the first implementation scheme of the user plane protocol stack configuration scheme #1 for a data reception, so a detailed description will be omitted herein.

3) Determination of a source identifier and Filtering by the MAC layer entity 515 using a source identifier:

This is same as explained in the first implementation scheme of the user plane protocol stack configuration scheme #1 for a data reception, so a detailed description will be omitted herein.

4) The MAC layer entity 515 determines a destination ID or an LCID of one or more MAC SDUs received in the MAC PDU. The destination ID or the LCID may be determined by reading the destination ID or the LCID from a MAC header of the MAC PDU. In case one part of the destination ID is transmitted in a destination identifier field in the MAC header of the MAC PDU and another part of the destination ID is transmitted in scheduling assignment information, the MAC layer entity 515 determines the destination ID by combining both of the parts of the destination ID.

5) For each MAC SDU(s) received in the MAC PDU, the MAC layer entity 515 in the UE determines whether there is a radio bearer for a data reception.

a) If there is no radio bearer (i.e. a PDCP layer entity and a RLC layer entity) which is already established except a default radio bearer(s), the MAC layer entity 515 uses the default radio bearer or a default radio bearer which is associated with the destination ID. The <source identifier=null, destination ID/LCID=null> is changed to a <source identifier, destination ID/LCID> of the MAC SDU received in the MAC PDU, so the radio bearer becomes a non default radio bearer. The MAC layer entity 515 transmits the MAC SDU the RLC layer entity 513 corresponding to the radio bearer. The MAC layer entity 515 triggers generation of a new default radio bearer.

b) If a non default radio bearer is already established, and if the <source identifier, destination ID/LCID> of the MAC SDU received in the MAC PDU is different from a <source identifier, destination ID/LCID> of each of existing radio bearers, the MAC layer entity 515 uses the default radio bearer or a default radio bearer which is associated with the destination ID. The <source identifier=null, destination ID/LCID=null> is changed to the <source identifier, destination ID/LCID> corresponding to the MAC SDU, so the radio bearer becomes a non default radio bearer. The MAC layer entity 515 transmits the MAC SDU to the RLC layer entity 513 corresponding to the radio bearer. The MAC layer entity 515 also triggers generation of a new default radio bearer.

c) If a radio bearer is already established, and if the <source identifier, destination ID/LCID> included in the MAC SDU is identical to a <source identifier, destination ID/LCID> of an old existing radio bearer, the MAC layer entity 515 transmits the MAC SDU to the RLC layer entity 513.

If there is no activity for a pre-defined time period, the radio bearer for the data reception is released. The established radio bearer for the data reception is released if the upper layer entity indicates to stop monitoring D2D communication.

Meanwhile, if voice service data is received from one TX UE, the MAC layer entity 515 may not establish a radio bearer with another TX UE for a voice service. Alternatively, the UE may release an old voice service, and generate a radio bearer for a voice service with a new TX UE. Here, the radio bearer with the new TX UE may be generated based on TX UE preference. The UE may identify a voice service using some indicator included in a MAC PDU.

Alternatively, maintenance for a voice service may be processed in the upper layer entity. If the voice service is received from one TX UE, voice service packets from another TX UE may be discarded by the upper layer entity.

As described above, in a user plane protocol stack configuration scheme #2 for a data reception which is based on each of the first implementation scheme to the fourth implementation scheme, a MAC layer entity may indicate a RRC layer entity to generate/release a radio bearer, or may generate/release a new radio bearer.

A user plane protocol stack configuration scheme #2 has been described above, and a user plane protocol stack configuration scheme #3 will be described below.

Firstly, a user plane protocol stack configuration scheme #3 for a data transmission will be described below.

A UE which transmits data maintains a plurality of radio bearers for a data transmission. Each radio bearer refers to one PDCP layer entity and one RLC entity. A different radio bearer is created for a different destination. A radio bearer is also different for a different traffic class for a destination (if needed). Here, the UE may perform a plurality of TX sessions concurrently for the same destination or a different destination. The radio bearer is mapped to one logical channel the logical channel is mapped to a D2D communication transport channel which is mapped to a D2D communication broadcast physical channel.

A radio bearer (i.e. a PDCP layer entity and a RLC layer entity) for a data transmission is established/created if a upper layer entity triggers the data transmission in the UE. A PDCP layer entity and a RLC layer entity are established/created and configured using default values.

The upper layer entity may indicate whether the data transmission in the UE is a broadcast transmission, a unicast transmission, or a group cast transmission. That is, the upper layer entity may indicate the data transmission in the UE is the broadcast transmission, the unicast transmission, or the group cast transmission by transmitting information which indicates that the data transmission in the UE is the broadcast transmission, the unicast transmission, or the group cast transmission. If the data transmission is the unicast transmission then upper layer entity provides the destination UE ID. If the data transmission is the groupcast transmission, then upper layer provides the destination Group ID. The UE ID of the UE may also be provided by the upper layer entity. The established/created PDCP layer entity and RLC layer entity are removed if the upper layer entity stops the data transmission. In the UE, a radio bearer (i.e. a PDCP layer entity and a RLC layer entity) which is established for a data transmission is released if the upper layer entity triggers release of the radio bearer which is established for the data transmission.

Meanwhile, the radio bearers may be identified as the following.

Each of the radio bearers 1 may be identified by the identifier of its associated logical channel, i.e. an LCID. Here, the LCID is local to a UE, and assignment of an LCID to a logical channel of a radio bearer is maintained by the UE. The LCID is unique assigned across all logical channels of radio bearers irrespective of the destination ID to which data is transmitted by the radio bearer. If the LCID is used to identify the radio bearers, the UE includes the LCID into a MAC header during a data transmission. The LCID to a service mapping may be defined, so the UE may identify the service based on the LCID.

Alternately the radio bearers may be identified using a destination ID and a LCID. Here, the LCID is local to a UE, and assignment of an LCID to a logical channel of a radio bearer is maintained by the UE. The LCID is unique only across logical channels of radio bearers of the same destination ID. If the LCID is used to identify the radio bearers together with the destination ID, then the UE includes the LCID into a MAC header during a data transmission. The LCID to a service mapping may be defined, so the UE may identify the service based on the LCID.

During the data transmission, the PDCP layer entity processes packets received from upper layer (i.e. applies a security and/or a header compression and/or a sequence numbering to the packets) and sends them to a RLC layer entity. The RLC layer entity processes these packets (i.e. RLC SDUs) (applies a sequence numbering and/or a fragmentation) and sends them to a MAC layer entity. The MAC layer entity transmits one or more of these packets (i.e. MAC SDUs) corresponding to the same destination ID in the MAC PDU.

During the data transmission, a source identifier and a destination identifier are transmitted by the UE and scheme of transmitting them is same as described in user plane protocol stack configuration scheme #1, so a detailed description will be omitted herein.

A user plane protocol stack configuration scheme #3 for a data transmission has been described above, and a user plane protocol stack configuration scheme #3 for a data reception will be described below.

The user plane protocol stack configuration scheme #3 for the data reception is based on one of the first implementation scheme to the fourth implementation scheme, and the user plane protocol stack configuration scheme #3 for the data reception which is based on each of the first implementation scheme to the fourth implementation scheme will be described below.

Firstly, a user plane protocol stack configuration scheme #3 for a data reception which is based on the first implementation scheme will be described below.

A UE receives data from one UE at a time. The UE maintains one or more radio bearers (i.e. PDCP layer entities and RLC layer entities) for a data reception, and each of the radio bearers (i.e. the PDCP layer entities and the RLC layer entities) is for a data reception from the same UE.

An example of a structure of a user plane protocol stack for a data transmission and reception which is based on a user plane protocol stack configuration scheme #3 in a connectionless communication system according to an embodiment of the present disclosure will be described with reference to FIG. 6.

Figure 6:
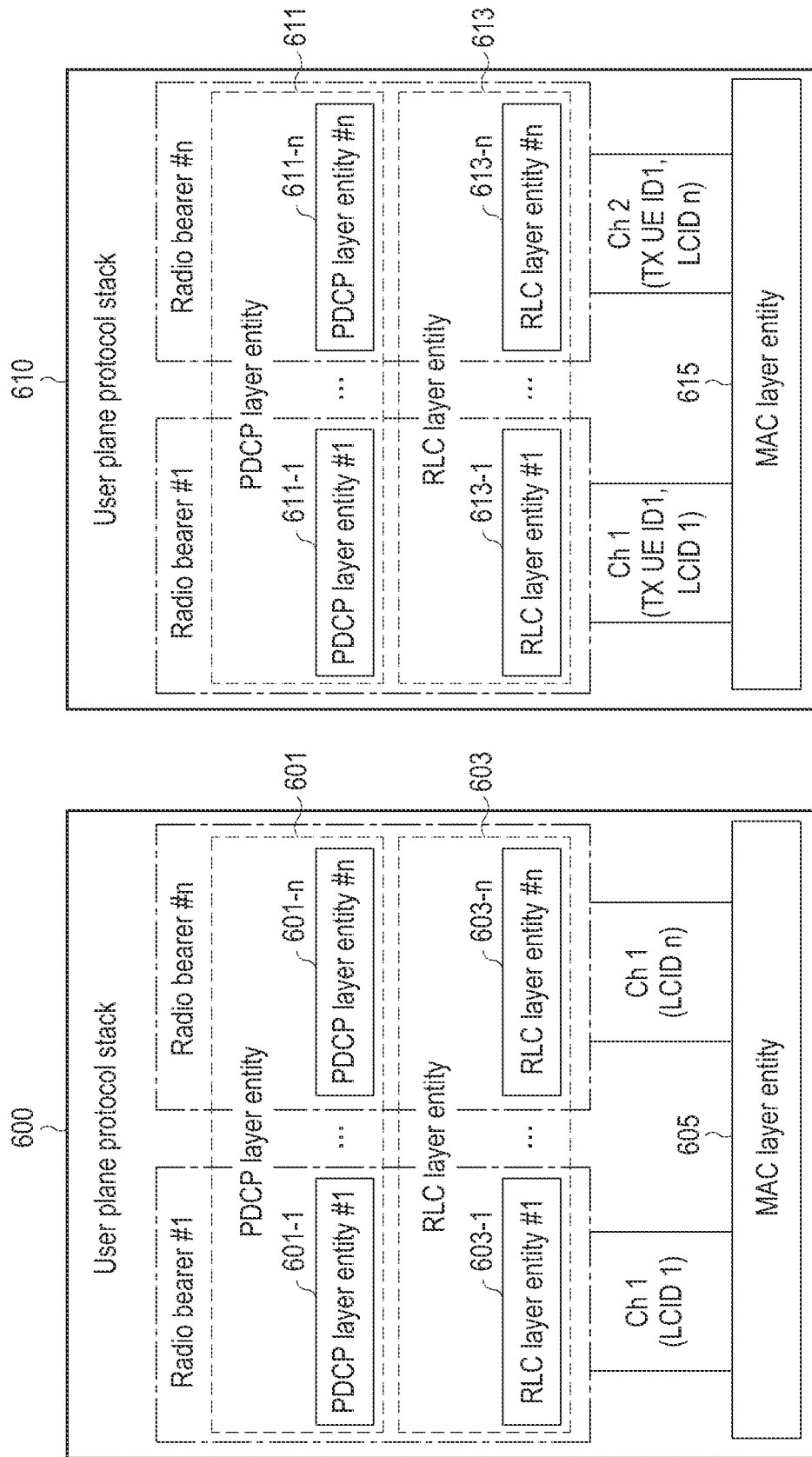
FIG. 6 schematically illustrates an example of a structure of a user plane protocol stack for a data transmission and reception which is based on a user plane protocol stack configuration scheme #3 in a connectionless communication system according to an embodiment of the present disclosure.

FIG. 6 schematically illustrates an example of a structure of a user plane protocol stack for a data transmission and reception which is based on a user plane protocol stack configuration scheme #3 in a connectionless communication system according to an embodiment of the present disclosure.

Referring to FIG. 6, it will be noted that a user plane protocol stack 600 in FIG. 6 is a user plane protocol stack for data transmission including a plurality of TX radio bearers, i.e. a plurality of PDCP layer entities 601 and a plurality of RLC layer entities 603, and a user plane protocol stack 610 in FIG. 6 is a user plane protocol stack for data reception including a plurality of RX radio bearers, i.e. a plurality of PDCP layer entities 611 and a plurality of RLC layer entities 613.

The user plane protocol stack 600 for data transmission includes a PDCP layer entity #1 601-1 and a RLC layer entity #1 603-1 corresponding to a first radio bearer #1, includes PDCP layer entity #n 601-n and a RLC layer entity #n 603-n corresponding to a radio bearer #n, and so on. The user plane protocol stack 600 for data transmission also includes a MAC layer entity 605 which is common across all of the radio bearers. Each of the PDCP layer entities 601 and the RLC layer entities 603 are identified by a LCID, wherein the LCID is unique across the radio bearers. Alternately each of the PDCP layer entities 601 and RLC layer entities 603 are identified by a destination ID and a LCID, wherein the LCID is unique across the radio bearers of the same destination.

The user plane protocol stack 610 for data reception includes a PDCP layer entity #1 611-1 and a RLC layer entity #1 613-1 corresponding to a first radio bearer #1, includes a PDCP layer entity #n 611-n and a RLC layer entity #n 613-n corresponding to a radio bearer #n, and so on. The user plane protocol stack 610 for data reception also includes a MAC layer entity 615 which is common across all of the radio bearers. Each of the PDCP layer entities 611 and the RLC layer entities 613 are identified by a source identifier and a LCID, wherein the LCID is assigned by a transmitting UE such that the LCID is unique across all of the radio bearers of the transmitting UE. Each of the PDCP layer entities 611 and the RLC layer entities 613 are identified by a source identifier, a destination ID and a LCID, wherein the LCID is assigned by the transmitting UE such that the LCID is unique only across the radio bearers (i.e. the PDCP layer entities and the RLC layer entities) of the same destination in the transmitting UE.

An operating process of a UE in a user plane protocol stack configuration scheme #3 for a data reception which is based on the first implementation scheme will be described below.

1) Filtering by a physical layer entity using a destination identifier in a scheduling assignment:

This is same as explained in the first implementation scheme of the user plane protocol stack configuration scheme #1 for a data reception, so a detailed description will be omitted herein. The destination identifier is transmitted to the MAC layer entity 615 along with the received MAC PDU.

2) Filtering by the MAC layer entity 615 using a destination identifier in the MAC PDU:

This is same as explained in the first implementation scheme of the user plane protocol stack configuration scheme #1 for a data reception, so a detailed description will be omitted herein.

3) Determination of a source identifier and Filtering by the MAC layer entity 615 using a source identifier:

This is same as explained in the first implementation scheme of the user plane protocol stack configuration scheme #1 for a data reception, so a detailed description will be omitted herein.

4) The MAC layer entity 615 determines a destination ID and/or an LCID of one or more MAC SDUs received in the MAC PDU. The destination ID and/or the LCID may be determined by reading the destination ID and/or the LCID from a MAC header of the MAC PDU. In case one part of the destination ID is transmitted in a destination identifier field in the MAC header of the MAC PDU and another part of the destination ID is transmitted in scheduling assignment information, the MAC layer entity 615 determines the destination ID by combining both of the parts of the destination ID.

5) For each MAC SDU(s) received in the MAC PDU, the MAC layer entity 615 in the UE determines whether there is a radio bearer (i.e. a PDCP layer entity and a RLC layer entity) for data reception.

a) If there is no radio bearer (i.e. a PDCP layer entity and a RLC layer entity) which is already established for a data reception, the MAC layer entity 615 triggers a creation/establishment of a new radio bearer for a data reception, and identifies the new radio bearer (i.e. a PDCP layer entity and a RLC layer entity) for the data reception using the source identifier and an LCID of the MAC SDU received in the MAC PDU.

Alternately, the MAC layer entity 615 identifies the new radio bearer (i.e. the PDCP layer entity and the RLC layer entity) for the data reception using the source identifier, a destination ID and an LCID of the MAC SDU received in the MAC PDU. The MAC layer entity 615 transmits the MAC SDU to the RLC layer entity 613 corresponding to the new radio bearer.

b) If a radio bearer (i.e. a PDCP layer entity and a RLC layer entity) is already established, and if the source identifier of the MAC SDU received in the MAC PDU is different from a source identifier of each of existing radio bearers, the MAC layer entity 615 triggers release of the existing radio bearers (i.e. PDCP layer entities and RLC layer entities), and establishment of a new radio bearer, and identifies a radio bearer (i.e. a PDCP layer entity and a RLC layer entity) using the <source identifier, LCID> of the MAC SDU.

Alternately, the MAC layer entity 615 identifies the new radio bearer (i.e. a PDCP layer entity and a RLC layer entity) for the data reception using the <Source Identifier, Destination ID and LCID> of the MAC SDU. The MAC layer entity 615 transmits the MAC SDU to the new RLC layer entity 613 corresponding to the new radio bearer.

c) If a radio bearer is already established for a data reception, and if the source identifier and the LCID of the MAC SDU received in the MAC PDU is identical to a source identifier and the LCID of an existing radio bearer for a data reception, the MAC layer entity 615 transmits the MAC SDU to the RLC layer entity 613 corresponding to the radio bearer. Alternately, If a radio bearer is already established for a data reception, and if the source identifier, a destination ID and an LCID of the MAC SDU is identical to a source identifier, a destination ID and an LCID of an existing radio bearer for a data reception, the MAC layer entity 615 transmits the MAC SDU to the RLC layer entity 613 corresponding to the existing radio bearer.

d) If a radio bearer is already established, and if the source identifier of the MAC SDU received in the MAC PDU is identical to the source identifier of the existing radio bearer, and an LCID of the MAC SDU is different from an LCID of the existing radio bearer, the MAC layer entity 615 triggers establishment of a new radio bearer, and transmits the MAC SDU to the RLC layer entity 613 corresponding to the new radio bearer. Alternately, if a radio bearer is already established, and if the source identifier of the MAC SDU is identical to the source identifier of the existing radio bearer, and an LCID and/or a destination ID of the MAC SDU is different from an LCID and/or a destination ID of the existing radio bearer, the MAC layer entity 615 triggers establishment of a new radio bearer, and transmits the MAC SDU to the RLC layer entity 613 corresponding to the new radio bearer.

If there is no activity for a pre-defined time period, the radio bearer for the data reception is released. The established radio bearer for the data reception is released if the upper layer entity indicates to stop monitoring D2D communication.

A user plane protocol stack configuration scheme #3 for a data reception which is based on the first implementation scheme has been described above, and a user plane protocol stack configuration scheme #3 for a data reception which is based on the second implementation scheme will be described below.

A UE receives data from one UE at a time. The UE which receives the data maintains one or more radio bearers (i.e. PDCP layer entities and RLC layer entities) for a data reception. Here, the user plane protocol stack is identical to a user plane protocol stack illustrated in FIG. 6, so a detailed description will be omitted herein.

Firstly, a UE establishes a default radio bearer using default configuration if a upper layer entity triggers to monitor D2D communication. The established default radio bearer may be identified by a <source identifier=null, LCID=null>. Alternately, the established default radio bearer may be identified by a <source identifier=null, destination ID=null, LCID=null>. The UE may also establish a plurality of default radio bearers. The plurality of default radio bearers may be for a different destination ID, different services, or a different destination ID and different services. Here, one of the plurality of the default radio bearers is for broadcast, one for unicast, and one or more for associated groups. The other services denote services which have different priorities such as a voice service and a data service.

An operating process of a UE in a user plane protocol stack configuration scheme #3 for a data reception which is based on the second implementation scheme will be described below.

1) Filtering by a physical layer entity using a destination identifier in a scheduling assignment:

This is same as explained in the first implementation scheme of the user plane protocol stack configuration scheme #1 for a data reception, so a detailed description will be omitted herein. The destination identifier is transmitted to the MAC layer entity 615 along with the received MAC PDU.

2) Filtering by the MAC layer entity 615 using a destination identifier in the MAC PDU:

This is same as explained in the first implementation scheme of the user plane protocol stack configuration scheme #1 for a data reception, so a detailed description will be omitted herein.

3) Determination of a source identifier and Filtering by the MAC layer entity 615 using a source identifier:

This is same as explained in the first implementation scheme of the user plane protocol stack configuration scheme #1 for a data reception, so a detailed description will be omitted herein.

4) The MAC layer entity 615 determines a destination ID and/or an LCID of one or more MAC SDUs received in the MAC PDU. The destination ID and/or the LCID may be determined by reading the destination ID and/or the LCID from a MAC header of the MAC PDU. In case one part of the destination ID is transmitted in a destination identifier field in the MAC header of the MAC PDU and another part of the destination ID is transmitted in scheduling assignment information, the MAC layer entity 615 determines the destination ID by combining both of the parts of the destination ID.

5) For each MAC SDU(s) received in the MAC PDU, the MAC layer entity 615 in the UE determines whether there is a radio bearer (i.e. a PDCP layer entity and a RLC layer entity) for data reception.

a) If there is no radio bearer (i.e. a PDCP layer entity and a RLC layer entity) which is already established except default radio bearers for a data reception, the MAC layer entity 615 uses the default radio bearers, a default radio bearer which is associated with a destination ID, a default radio bearer which is associated with a service of a MAC SDU received in the MAC PDU, or a default radio bearer which is associated with a service of the MAC PDU and the destination ID. The <source identifier=null, LCID=null> is changed to a <source identifier, LCID> corresponding to the MAC SDU, so the default radio bearer becomes a non default radio bearer.

Alternately, the <source identifier=null, Destination ID=null LCID=null> is changed to a <source identifier, Destination ID, LCID> corresponding to the MAC PDU, so the default radio bearer becomes a non default radio bearer. The MAC layer entity 615 transmits the MAC SDU to the RLC layer entity 613 corresponding to the radio bearer. The MAC layer entity 615 also triggers generation of a new default radio bearer with same characteristics as the default bearer which is already used.

b) If a non default radio bearer is already established, and if a source identifier of the MAC SDU received in the MAC PDU is different from a source identifier of each of existing non default radio bearers, the MAC layer entity 615 triggers release of the existing non default radio bearers. The MAC layer entity 615 uses the default radio bearer, a default radio bearer which is associated with the destination ID, a default bearer which is associated with a service of the MAC SDU, or a default bearer which is associated with the destination ID and a service of the MAC SDU. The <source identifier=null, LCID=null> is changed to a <source identifier, LCID> corresponding to the MAC SDU, so the default radio bearer becomes a non default radio bearer.

Alternately, the <source identifier=null, Destination ID=null LCID=null> is changed to a <source identifier, Destination ID, LCID> corresponding to the MAC SDU, so the default radio bearer becomes a non default radio bearer. The MAC layer entity 615 transmits the MAC SDU to the RLC layer entity 613 corresponding to the radio bearer. The MAC layer entity 615 also triggers generation of a new default radio bearer with same characteristics as the default bearer which is already used.

c) If a non default radio bearer is already established, and if a source identifier of a MAC SDU received in the MAC PDU is identical to a source identifier of an existing non default radio bearer, and an LCID of the MAC SDU is identical to an LCID of the existing non default radio bearer, the MAC layer entity 615 transmits the MAC SDU to the RLC layer entity 613 corresponding to the radio bearer.

Alternately, If a non default radio bearer is already established, and if a source identifier of the MAC SDU is identical to a source identifier of an existing non default radio bearer, and a LCID and a destination ID of the MAC SDU is identical to a LCID and a Destination ID of the existing non default radio bearer, the MAC layer entity 615 transmits the MAC SDU to the RLC layer entity 613 corresponding to the existing non default radio bearer.

d) If a radio bearer is already established, and if a \source identifier of a MAC SDU received in the MAC PDU is identical to a source identifier of an existing non default radio bearer and a LCID of MAC PDU is different from a LCID of the existing non default radio bearer, then the MAC layer entity 615 uses a default radio bearer, that is a default radio bearer which is associated with a destination ID, a default radio bearer which is associated with the received MAC SDU, or a default radio bearer which is associated with the destination ID and the MAC SDU.

Alternately, If a radio bearer is already established, and if a source identifier of the MAC SDU is identical to a source identifier of an existing non default radio bearer and a LCID or a destination ID of the MAC SDU is different from a LCID or a destination ID of the existing non default radio bearer, then the MAC layer entity 615 uses a default radio bearer, that is a default radio bearer which is associated with a destination ID, a default radio bearer which is associated with the MAC SDU, or a default radio bearer which is associated with the destination ID and the MAC SDU. The <source identifier=null, LCID=null> is changed to a <source identifier, LCID> corresponding to the MAC SDU, so the default radio bearer becomes a non default radio bearer.

Alternately, the <source identifier=null, Destination ID=null LCID=null> is changed to a <source identifier, Destination ID, LCID> corresponding to the MAC PDU, so the default radio bearer becomes a non default radio bearer. The MAC layer entity 615 transmits the MAC SDU to the RLC layer entity 613 corresponding to the radio bearer. The MAC layer entity 615 also triggers generation of a new default radio bearer with same characteristics as the default bearer which is already used.

If there is no activity for a pre-defined time period, the non default radio bearer for the data reception is released, and a default radio bearer is established with default configuration. The established default radio bearer and the established non default radio bearer for the data reception are released if the upper layer entity indicates to stop monitoring D2D communication.

A user plane protocol stack configuration scheme #3 for a data reception which is based on the second implementation scheme has been described above, and a user plane protocol stack configuration scheme #3 for a data reception which is based on the third implementation scheme will be described below.

A UE may receive data from a plurality of TX UEs concurrently. The UE may maintain one or more radio bearers (i.e. PDCP layer entities and RLC layer entities) for a data reception. Each radio bearer is for a data reception from a different <source identifier, LCID> or from a different <source identifier, Destination ID, LCID>.

Another example of a structure of a user plane protocol stack for a data transmission and reception which is based on a user plane protocol stack configuration scheme #3 in a connectionless communication system according to an embodiment of the present disclosure will be described with reference to FIGS. 7A and 7B.

Figure 7A:
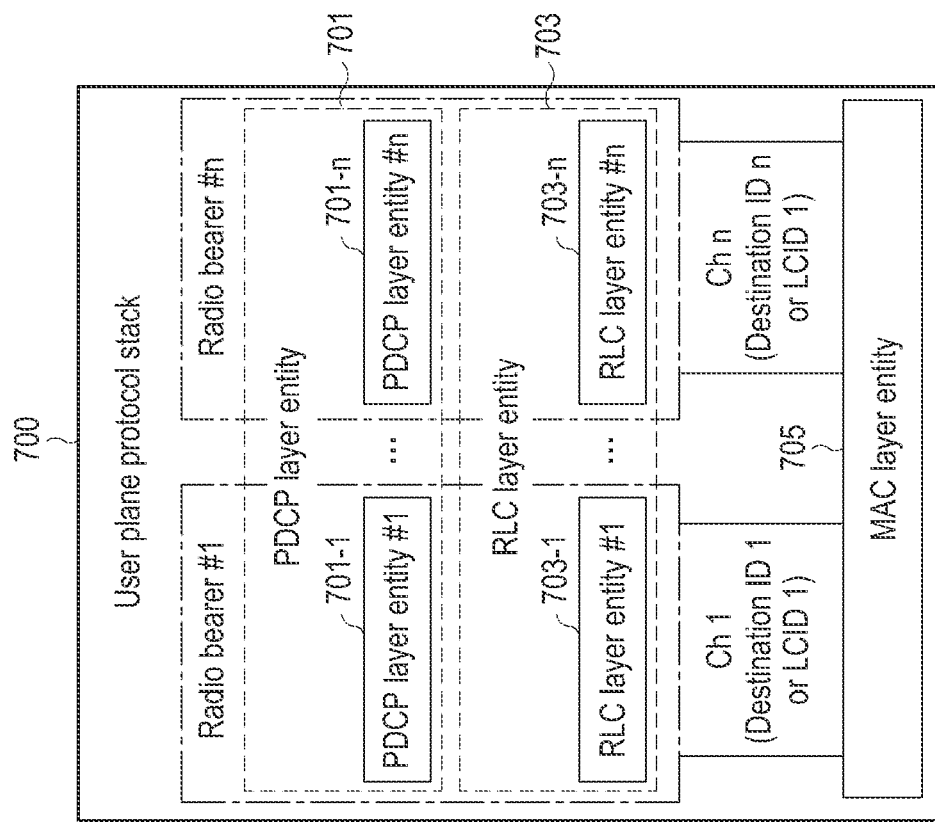
FIGS. 7A and 7B schematically illustrate another example of a structure of a user plane protocol stack for a data transmission and reception which is based on a user plane protocol stack configuration scheme #3 in a connectionless communication system according to an embodiment of the present disclosure.
Figure 7B:
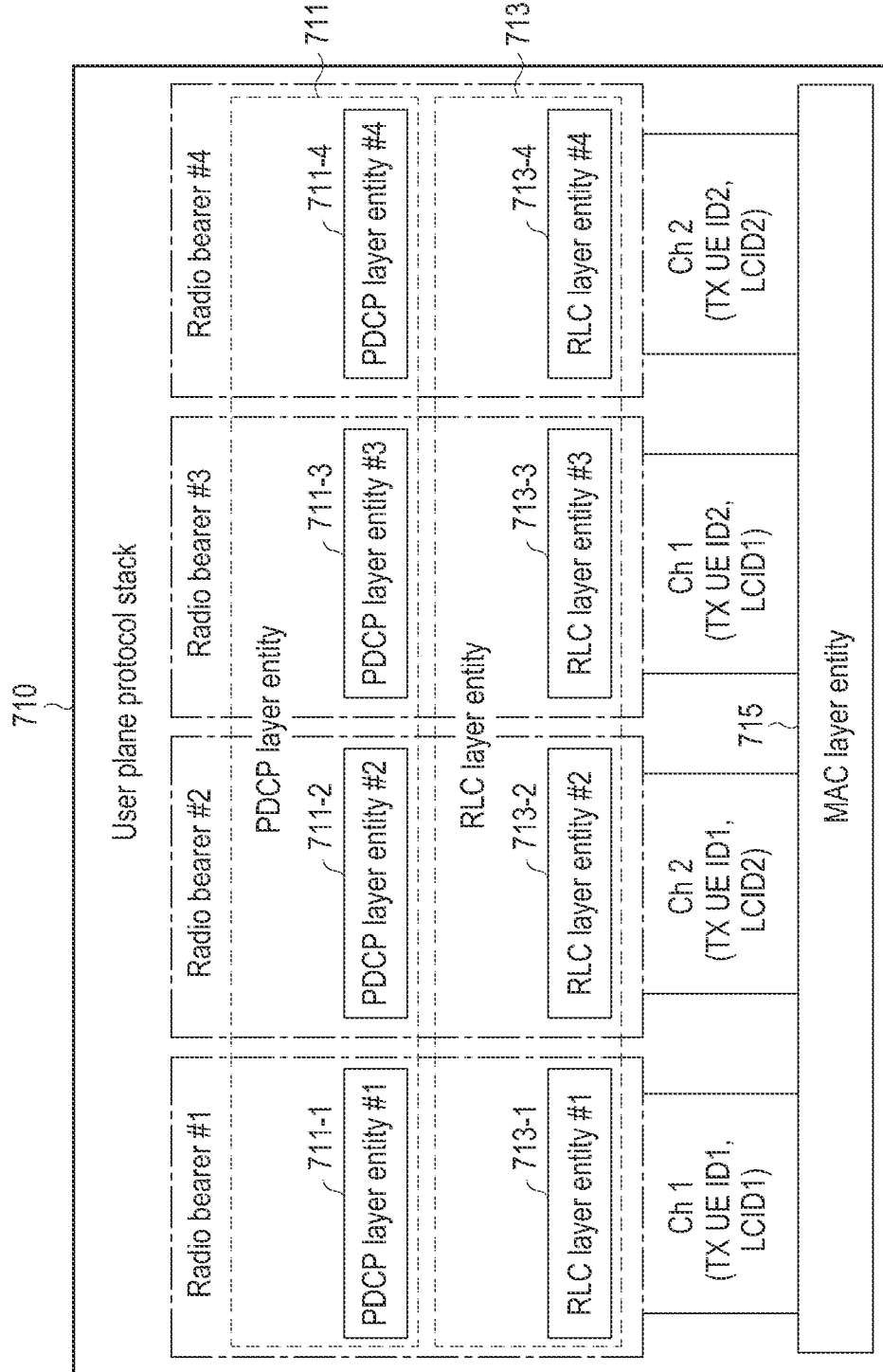

FIGS. 7A and 7B schematically illustrate another example of a structure of a user plane protocol stack for a data reception which is based on a user plane protocol stack configuration scheme #3 in a connectionless communication system according to an embodiment of the present disclosure.

Referring to FIGS. 7A & 7B, it will be noted that a user plane protocol stack 700 in FIG. 7A is a user plane protocol stack for data transmission including a plurality of TX radio bearers, i.e. a plurality of PDCP layer entities 701 and a plurality of RLC layer entities 703, and a user plane protocol stack 710 in FIG. 7B is a user plane protocol stack for data reception including a plurality of RX radio bearers, i.e. a plurality of PDCP layer entities 711 and a plurality of RLC layer entities 713.

The user plane protocol stack 700 for data transmission includes a PDCP layer entity #1 701-1 and a RLC layer entity #1 703-1 corresponding to a first radio bearer #1, includes PDCP layer entity #n 701-n and a RLC layer entity #n 703-n corresponding to a radio bearer #n, and so on. The user plane protocol stack 700 for data transmission also includes a MAC layer entity 705 which is common across all of the radio bearers. The PDCP layer entity 701 and RLC layer entity 703 are identified by a LCID, wherein the LCID is unique across the radio bearers. Alternately, each of the PDCP layer entities 701 and the RLC layer entities 703 are identified by a destination ID and a LCID, wherein the LCID is unique across the radio bearers of the same destination.

The user plane protocol stack 710 for data reception includes a PDCP layer entity #1 711-1 and a RLC layer entity #1 713-1 corresponding to a first radio bearer #1, includes a PDCP layer entity #2 711-2 and a RLC layer entity #2 713-2 corresponding to a radio bearer #2, and so on. The user plane protocol stack 710 for data reception also includes a MAC layer entity 715 which is common across all of the radio bearers. Each of the PDCP layer entities 711 and the RLC layer entities 713 are identified by a source identifier and a LCID, wherein the LCID is assigned by a transmitting UE such that the LCID is unique across all of the radio bearers (i.e. PDCP layer entities and RLC layer entities) of the transmitting UE. Each of the PDCP layer entities 711 and the RLC layer entities 713 are identified by a source identifier, a destination ID and a LCID, wherein the LCID is assigned by the transmitting UE such that the LCID is unique only across the radio bearers (i.e. the PDCP layer entities and the RLC layer entities) of the same destination in the transmitting UE.

An operating process of a UE in a user plane protocol stack configuration scheme #3 for a data reception which is based on the third implementation scheme will be described below.

1) Filtering by a physical layer entity using a destination identifier in a scheduling assignment:

This is same as explained in the first implementation scheme of the user plane protocol stack configuration scheme #1 for a data reception, so a detailed description will be omitted herein. The destination identifier received in scheduling assignment is transmitted to the MAC layer entity 715 along with the received MAC PDU.

2) Filtering by the MAC layer entity 715 using a destination identifier in the MAC PDU:

This is same as explained in the first implementation scheme of the user plane protocol stack configuration scheme #1 for a data reception, so a detailed description will be omitted herein.

3) Determination of a source identifier and Filtering by the MAC layer entity 715 using a source identifier:

This is same as explained in the first implementation scheme of the user plane protocol stack configuration scheme #1 for a data reception, so a detailed description will be omitted herein.

4) The MAC layer entity 715 determines a destination ID and/or an LCID of one or more MAC SDUs received in the MAC PDU. The destination ID and/or the LCID may be determined by reading the destination ID and/or the LCID from a MAC header of the MAC PDU. In case one part of the destination ID is transmitted in destination identifier field in the MAC header of the MAC PDU and another part of the destination ID is transmitted in scheduling assignment information, the MAC layer entity 715 determines the destination ID by combining both of the parts of the destination ID.

5) For each MAC SDU(s) received in the MAC PDU, the MAC layer entity 715 in the UE determines whether there is a radio bearer (i.e. a PDCP layer entity and a RLC layer entity) for data reception.

a) If there is no radio bearer (i.e. a PDCP layer entity and a RLC layer entity) which is already established/created for a data reception, the MAC layer entity 715 triggers creation/establishment of a new radio bearer (i.e. a PDCP layer entity and a RLC layer entity), and identifies the new radio bearer (i.e. the PDCP layer entity and the RLC layer entity) for the data reception using a source identifier and a LCID or using a source identifier, a destination ID and a LCID of the MAC SDU received in the MAC PDU. The MAC layer entity 715 transmits the MAC SDU to to the RLC layer entity 713 corresponding to the new radio bearer.

b) If a radio bearer (i.e. a PDCP layer entity and a RLC layer entity) is already established/created, and if a source identifier and/or a LCID of a MAC SDU received in the MAC PDU is different from a source identifier and/or a LCID of an already established/created radio bearer (i.e. a PDCP layer entity and a RLC layer entity), the MAC layer entity 715 triggers establishment of a new radio bearer (i.e. a PDCP layer entity and a RLC layer entity), and identifies the new radio bearer (i.e. the PDCP layer entity and the RLC layer entity) using a source identifier and a LCID of the MAC SDU.

Alternately, if a radio bearer (i.e. a PDCP layer entity and a RLC layer entity) is already established/created, and if a source identifier and/or a destination ID and/or a LCID of a MAC SDU received in the MAC PDU is different from a source identifier and/or a destination ID and/or a LCID of an already established/created radio bearer (i.e. a PDCP layer entity and a RLC layer entity), the MAC layer entity 715 triggers an establishment of a new radio bearer (i.e. a PDCP layer entity and a RLC layer entity), and identifies the new radio bearer (i.e. the PDCP layer entity and the RLC layer entity) using the source identifier, the destination ID and the LCID of the MAC SDU. The MAC layer entity 715 transmits MAC SDU(s) included in the MAC PDU to the RLC layer entity 713 corresponding to the new radio bearer.

c) If a radio bearer (i.e. a PDCP layer entity and a RLC layer entity), is already established/created, and if the source identifier and LCID of the MAC SDU received in the MAC PDU is identical to a source identifier and a LCID of established/created radio bearer, the MAC layer entity 715 transmits the MAC SDU to the RLC layer entity 713 corresponding to the radio bearer.

Alternately, If a radio bearer (i.e. a PDCP layer entity and a RLC layer entity), is already established/created, and if the source identifier and a destination ID and a LCID of the MAC SDU is identical to a source identifier and a destination ID and a LCID of the established/created radio bearer, the MAC layer entity 715 transmits the MAC SDU to the RLC layer entity 713 corresponding to the established/created radio bearer.

If there is no activity for a pre-defined time period, the radio bearer (i.e. a PDCP layer entity and a RLC layer entity) for the data reception is released.

Meanwhile, if a voice service is received from one TX UE, the MAC layer entity 715 may not establish a radio bearer (i.e. a PDCP layer entity and a RLC layer entity) with another TX UE for the voice service. Alternatively, the UE may release an old voice service, and generate a radio bearer (i.e. a PDCP layer entity and a RLC layer entity) for a voice service with a new TX UE. Here, the radio bearer (i.e. a PDCP layer entity and a RLC layer entity) for the voice service may be generated based on TX UE preference. The UE may identify a voice service using some indicator included in a MAC PDU.

Alternatively, maintenance for one voice service may be processed in the upper layer entity. If the voice service is received from one TX UE, voice service packets from another TX UE may be discarded by the upper layer entity.

A user plane protocol stack configuration scheme #3 for a data reception which is based on the third implementation scheme has been described above, and a user plane protocol stack configuration scheme #3 for a data reception which is based on the fourth implementation scheme will be described below.

A UE may receive data from a plurality of TX UEs concurrently. The UE which receives the data maintains one or more radio bearers or logical channels for a data reception. Each radio bearer or each logical channel is for a data reception from a different <source identifier, LCID> or different <source identifier, Destination ID, LCID>. Here, the user plane protocol stack is identical to a user plane protocol stack illustrated in FIGS. 7A and 7B, so a detailed description will be omitted herein.

The UE establishes a default radio bearer using default configuration if a upper layer entity triggers to monitor D2D communication. The established default radio bearer is identified by a source identifier=null and LCID=null> or using source identifier=null and Destination ID=null and LCID=null. The UE may also establish a plurality of default radio bearers. The plurality of default radio bearers may be for a different destination ID, different services, or a different destination ID and different services. Here, one of the plurality of the default radio bearers may exist for broadcast, one for unicast, and one or more for associated groups. The other services may be services which have different priorities such as a voice service and a data service. The default bearers may be established for a different service for each destination ID.

An operating process of a UE in a user plane protocol stack configuration scheme #3 for a data reception which is based on the fourth implementation scheme will be described below.

1) Filtering by a physical layer entity using a destination identifier in a scheduling assignment:

This is same as explained in the first implementation scheme of the user plane protocol stack configuration scheme #1 for a data reception, so a detailed description will be omitted herein. The destination identifier is transmitted to the MAC layer entity 715 along with the received MAC PDU.

2) Filtering by the MAC layer entity 715 using a destination identifier in the MAC PDU:

This is same as explained in the first implementation scheme of the user plane protocol stack configuration scheme #1 for a data reception, so a detailed description will be omitted herein.

3) Determination of a source identifier and Filtering by the MAC layer entity 715 using a source identifier:

This is same as explained in first implementation scheme of a user plane protocol stack configuration scheme #1 for a data reception, so a detailed description will be omitted herein.

4) The MAC layer entity 715 determines a destination ID and/or an LCID of one or more MAC SDUs received in the MAC PDU. The destination ID and/or the LCID may be determined by reading the destination ID and/or the LCID from a MAC header of the MAC PDU. In case one part of the destination ID is transmitted in a destination identifier field in the MAC header of the MAC PDU and another part of the destination ID is transmitted in scheduling assignment information, the MAC layer entity 715 determines the destination ID by combining both of the parts of the destination ID.

5) For each MAC SDU(s) received in the MAC PDU, the MAC layer entity 715 in the UE determines whether there is a radio bearer (i.e. a PDCP layer entity and a RLC layer entity) for data reception.

a) If there is no radio bearer (i.e. a PDCP layer entity and a RLC layer entity (which is already established except default radio bearers (i.e. default PDCP layer entities and default RLC layer entities), the MAC layer entity 715 uses the default radio bearer (i.e. the default PDCP layer entity and the default RLC layer entity), that is a default radio bearer (i.e. a default PDCP layer entity and a default RLC layer entity) which is associated with the destination ID, a default radio bearer (i.e. a default PDCP layer entity and a default RLC layer entity) which is associated with a service of a MAC SDU received in the MAC PDU, or a default radio bearer (i.e. a default PDCP layer entity and a default RLC layer entity) which is associated with a service of the MAC SDU and the destination ID. The source identifier=null, and LCID=null is changed to a source identifier and LCID corresponding to the MAC SDU, so the default radio bearer becomes a non default radio bearer.

Alternately, the source identifier=null, Destination ID=null and LCID=null is changed to a source identifier, destination ID and LCID corresponding to the MAC SDU, so the default radio bearer becomes a non default radio bearer. The MAC layer entity 715 transmits the MAC SDU(s) included in the MAC PDU to the RLC layer entity 713 corresponding to the radio bearer. The MAC layer entity 715 triggers a creation/establishment of a new default radio bearer. The MAC layer entity 715 also triggers a creation/establishment of a new default radio bearer with same characteristics as the default bearer which is used.

b) If a radio bearer (i.e. a PDCP layer entity and a RLC layer entity) is already established, and if the source identifier and/or a LCID of the MAC SDU received in the MAC PDU is different from a source identifier and/or a LCID of each of existing radio bearers, the MAC layer entity 715 uses the default radio bearer, a default radio bearer which is associated with the destination ID, a default bearer which is associated with a service of the MAC SDU, or a default bearer which is associated with the destination ID and a service of the MAC SDU. The source identifier=null, and LCID=null is changed to a source identifier and LCID corresponding to the MAC SDU, so the default radio bearer becomes a non default radio bearer.

Alternately, If a radio bearer (i.e. a PDCP layer entity and a RLC layer entity) is already established, and if the source identifier and/or the destination ID and/or the LCID of the MAC SDU received in the MAC PDU is different from a source identifier and/or a destination ID and/or a LCID of each of existing radio bearers, the MAC layer entity 715 uses a default radio bearer, that is a default radio bearer which is associated with the destination ID, a default bearer which is associated with a service of the MAC SDU, or a default bearer which is associated with the destination ID and a service of the MAC SDU. The source identifier=null, Destination ID=null and LCID=null is changed to a source identifier, destination ID and LCID corresponding to the MAC SDU, so the default radio bearer becomes a non default radio bearer. The MAC layer entity 715 transmits the MAC SDU to the RLC layer entity 713 corresponding to the default radio bearer. The MAC layer entity 715 also triggers generation of a new default radio bearer (i.e a PDCP layer entity and a RLC layer entity) with same characteristics as the default bearer which is used.

c) If a radio bearer (i.e. a PDCP layer entity and a RLC layer entity) is already established, and if the source identifier and the LCID of the MAC SDU received in the MAC PDU is identical to the source identifier and the LCID of the existing radio bearer, the MAC layer entity 715 transmits the MAC SDU to the RLC layer entity 713 corresponding to the existing radio bearer.

Alternately, if a radio bearer (i.e. a PDCP layer entity and a RLC layer entity) is already established, and if the source identifier, the destination ID and the LCID of the MAC SDU is identical to the source identifier, the destination ID and the LCID of the existing radio bearer, the MAC layer entity 715 transmits the MAC SDU to the RLC layer entity 713 corresponding to the existing radio bearer.

If there is no activity for a pre-defined time period, the radio bearer (i.e. the PDCP layer entity and the RLC layer entity) for the data reception is released. The established default radio bearer (i.e. a default PDCP layer entity and a default RLC layer entity) and the established non default radio bearer (i.e. a non default PDCP layer entity and a non default RLC layer entity) for the data reception are released if the upper layer entity indicates to stop monitoring D2D communication.

Meanwhile, if a voice service is received from one TX UE, the MAC layer entity 715 may not establish a radio bearer (i.e. a PDCP layer entity and a RLC layer entity) with another TX UE for a voice service. Alternatively, the UE may release an old voice service, and generate a radio bearer (i.e. a PDCP layer entity and a RLC layer entity) for a voice service with a new TX UE. Here, the radio bearer (i.e. the PDCP layer entity and the RLC layer entity) for the voice service may be generated based on TX UE preference. The UE may identify a voice service using some indicator included in a MAC PDU.

Alternatively, maintenance for one voice service may be processed in the upper layer entity. If the voice service is received from one TX UE, voice packets from another TX UE may be discarded by the upper layer entity.

A process of initializing a radio link control (RLC) serial number (SN) in the RLC layer entity when the RLC layer entity is created for data reception will be described below.

In a user plane protocol stack configuration scheme #1, a user plane protocol stack configuration scheme #2, and a user plane protocol stack configuration scheme #3, when a RLC Unacknowledged Mode (UM) or a RLC Acknowledged Mode (AM) entity is created for data reception, then receive state variable number VR(UR) is initialized to SN of first received PDU. The receive state variable number VR(UR) holds the value of the SN of the earliest PDU that is still considered for reordering.

When a RLC Unacknowledged Mode (UM) or a RLC Acknowledged Mode (AM) entity is created for D2D data reception, the receive state variable number VR(UH) is initialized to the SN of a first received PDU. The receive state variable number VR(UH) holds the value of the SN following the SN of the UMD PDU with the highest SN among received UMD PDUs, and it serves as the higher edge of the reordering window.

A robust header compression (ROHC) scheme in a uni-directional mode (U-mode) for 1: M communication will be described below.

In a UM, the ROHC scheme transits periodically from a no compression state, e.g., an initialization and refresh (IR) state to a low compression state, e.g., a first order (FO) state and a high compression state, e.g., a second order (SO) state.

In a group cast, a new receiving UE (RX UE) may join a data session any time. As a result, the new RX UE may not be able to decompress data packets until a compressor transits to the no compressor state in a TX UE. So, a period of transitions among states in the ROHC scheme may be set relatively short for preventing that a period during which compression for a data packet is interrupt becomes long. However, transitions among states with a relatively short period will lead to very low compression efficiency.

So, in an embodiment of the present disclosure, if a new RX UE joins a data session, and is not able to decompress data, an indication is transmitted to a TX UE by a PDCP layer entity of the new RX UE. Here, the indication may be transmitted using fixed time/frequency resources, fixed physical layer entity parameters, and a fixed content. Even if a plurality of new RX UEs transmit the indication, there is no issue as a TX UE will decode the fixed time/frequency resources. Upon receiving the indication, the TX UE transits into a no compression state, or transmits uncompressed packets during some duration.

In at least some of a user plane protocol stack configuration scheme #1 to a user plane protocol stack configuration scheme #3, a source UE ID is encoded in source identifier field and a destination ID or a part of the destination ID is encoded into a destination identifier field in a MAC header of a MAC PDU. The source UE ID and the destination ID or the part of the destination ID may be included in the MAC header using one of the first implementation scheme to the fifth implementation scheme, and this will be described below.

Firstly, a process of including a source UE ID and a destination ID into a MAC header using the first implementation scheme in a connectionless communication system according to an embodiment of the present disclosure will be described below.

In a connectionless communication system according to an embodiment of the present disclosure, a MAC header includes at least one MAC sub-header. Each MAC sub-header included in the MAC header corresponds to a MAC control element (CE) or a MAC SDU included in a payload included in a MAC PDU, or indicates padding. The MAC sub-header includes an LCID field which identifies a type of a MAC CE or a logical channel which is associated with the MAC SDU, or identifies that the MAC sub-header is a padding sub-header.

In an embodiment of the present disclosure, a new type of MAC sub-header indicating a source UE ID and a destination ID is defined, and this will be described with reference to FIG. 8.

FIG. 8 schematically illustrates an example of a format of a MAC sub-header indicating a source UE ID and a destination ID in a connectionless communication system according to an embodiment of the present disclosure.

Referring to FIG. 8, the MAC sub-header includes a R field, an E field, an LCID field, a source identifier field, and a destination identifier field.

The R field represents a reserved field, the E field includes information indicating whether there is other MAC sub-header following the MAC sub-header, the LCID field includes information indicating that the MAC sub-header carriers a source identifier and a destination identifier fields, the source identifier field includes the source UE ID, and the destination identifier field includes the destination ID or part of destination ID.

Meanwhile, a location of the MAC sub-header indicating the source UE ID and the destination ID or a part of the destination ID may be determined based on the following rules.

Firstly, if there is no padding in the MAC PDU, or if a length of the padding is more than a preset length, e.g., 2 bytes, the MAC sub-header indicating the source UE ID and the destination ID or a part of the destination ID may be the first MAC sub-header among MAC sub-headers included in the MAC PDU.

Secondly, if the length of the padding included in the MAC PDU is the preset length, e.g., 1 byte, the MAC sub-header indicating the source UE ID and the destination ID or a part of the destination ID may be the second MAC sub-header among the MAC sub-headers included in the MAC PDU. In this case, the first MAC sub-header among the MAC sub-headers included in the MAC PDU is a padding sub-header.

Thirdly, if the length of the padding included in the MAC PDU is the preset length, e.g., 2 bytes, the MAC sub-header indicating the source UE ID and the destination ID or a part of the destination ID may be the third MAC sub-header among the MAC sub-headers included in the MAC PDU. In this case, the first and second MAC sub-headers among the MAC sub-headers included in the MAC PDU are padding sub-headers.

An example of a format of a MAC sub-header indicating a source UE ID and a destination ID or a part of the destination ID in a connectionless communication system according to an embodiment of the present disclosure has been described with reference to FIG. 8, and a format of a MAC sub-header indicating a source UE ID in a connectionless communication system according to an embodiment of the present disclosure will be described with reference to FIG. 9A.

FIG. 9A schematically illustrates a format of a MAC sub-header indicating a source UE ID in a connectionless communication system according to an embodiment of the present disclosure.

Referring to FIG. 9A, the MAC sub-header includes a R field, an E field, an LCID field, and a source identifier field.

The R field represents a reserved field, the E field includes information indicating whether there is other MAC sub-header following the MAC sub-header, the LCID field includes information indicating that the MAC sub-header carriers a source identifier field and the source identifier field includes the source UE ID.

In FIG. 9A, the LCID field includes the information indicating that the MAC sub-header carriers the source identifier. However, it will be understood by those of ordinary skill in the art that the LCID field may include information indicating one of that the MAC sub-header carriers the source UE ID, that the MAC sub-header carriers the destination ID, and that the MAC sub-header carriers the source UE ID and the destination ID.

A format of a MAC sub-header indicating a source UE ID in a connectionless communication system according to an embodiment of the present disclosure has been described with reference to FIG. 9A, and a format of a MAC sub-header indicating a destination ID in a connectionless communication system according to an embodiment of the present disclosure will be described with reference to FIG. 9B.

FIG. 9B schematically illustrates a format of a MAC sub-header indicating a destination ID in a connectionless communication system according to an embodiment of the present disclosure.

Referring to FIG. 9B, the MAC sub-header includes a R field, an E field, an LCID field, and a destination identifier field.

The R field represents a reserved field, the E field includes information indicating whether there is other MAC sub-header following the MAC sub-header, the LCID field includes information indicating that the MAC sub-header carriers a destination identifier field, and the destination identifier field includes the destination ID or part of destination ID.

In FIG. 9B, the LCID field includes the information indicating that the MAC sub-header carriers the destination ID. However, it will be understood by those of ordinary skill in the art that the LCID field may include information indicating one of that the MAC sub-header carriers the source ID, that the MAC sub-header carriers the destination ID, and that the MAC sub-header carriers the source UE ID and the destination ID.

A process of including a source UE ID and a destination ID into a MAC header using the first implementation scheme in a connectionless communication system according to an embodiment of the present disclosure has been described above, and a process of including a source UE ID and a destination ID into a MAC header using the second implementation scheme in a connectionless communication system according to an embodiment of the present disclosure will be described below.

In a connectionless communication system according to an embodiment of the present disclosure, a MAC header includes a source identifier field, a destination identifier field, and a MAC PDU format version number field. These fields are included in a D2D subheader, and the D2D subheader is always included in a beginning of the MAC header. The other MAC subheaders indicating a MAC CE or MAC SDUs or padding follows the D2D subheader.

An example of a format of a MAC header indicating a source identifier field, a destination identifier field, and a MAC PDU format version number field in a connectionless communication system according to an embodiment of the present disclosure will be described with reference to FIG. 10. The MAC PDU format version number field indicates which version of the D2D-SCH subheader is used.

Figure 10:
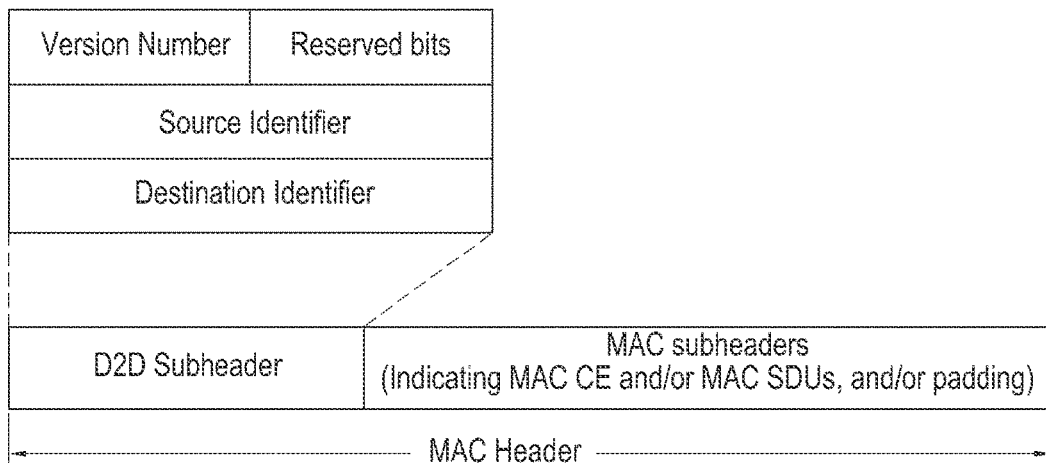
FIG. 10 schematically illustrates an example of a format of a MAC header indicating a source UE ID and a destination ID in a connectionless communication system according to an embodiment of the present disclosure.

FIG. 10 schematically illustrates an example of a format of a MAC header indicating a source UE ID and a destination ID in a connectionless communication system according to an embodiment of the present disclosure.

Referring to FIG. 10, the MAC header includes a D2D subheader and MAC sub-headers. The D2D subheader includes a MAC PDU format version number field, a source identifier field, and a destination identifier field. The source identifier field includes a source UE ID, and the destination identifier field includes a destination ID or a part of the destination ID. The MAC sub-headers include one or more subheaders indicating at least one of a MAC CE, MAC SDUs, and padding.

An example of a format of a MAC header indicating a source ID and a destination ID in a connectionless communication system according to an embodiment of the present disclosure has been described with reference to FIG. 10, and another example of a format of a MAC header indicating a source UE ID and a destination ID or a part of the destination ID in a connectionless communication system according to an embodiment of the present disclosure will be described with reference to FIG. 11A.

Figure 11A:
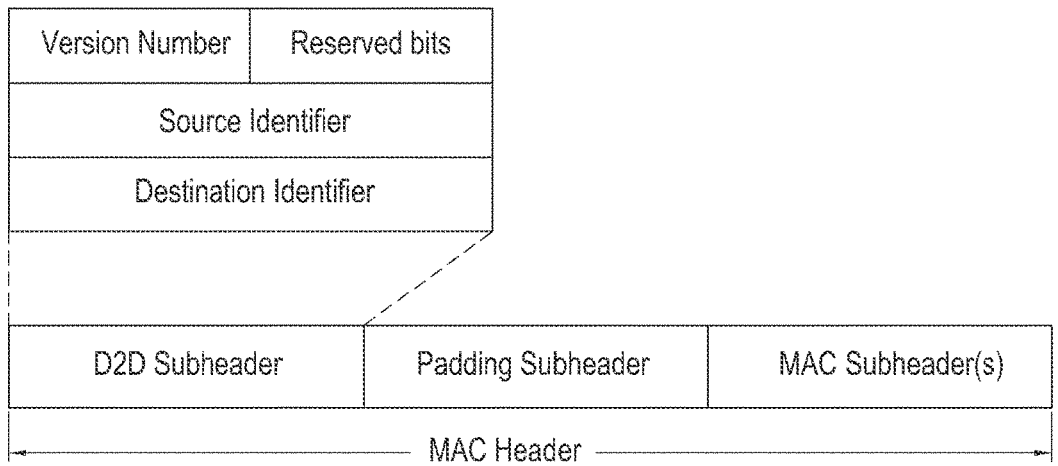
FIG. 11A schematically illustrates another example of a format of a MAC header indicating a source UE ID and a destination ID in a connectionless communication system according to an embodiment of the present disclosure.

FIG. 11A schematically illustrates another example of a format of a MAC header indicating a source UE ID and a destination ID or a part of the destination ID in a connectionless communication system according to an embodiment of the present disclosure.

Referring to FIG. 11A, it will be noted that a MAC header in FIG. 11A is a MAC header in a case that one byte padding is considered. The MAC header includes a D2D subheader, a padding sub-header, and MAC sub-headers. The D2D subheader includes a MAC PDU format version number field, a source identifier field, and a destination identifier field. The padding subheader is present after the D2D subheader and before MAC sub-headers. The source identifier field includes a source UE ID, and the destination identifier field includes a destination ID or a part of the destination ID. The padding sub-header includes padding. Here, the padding sub-header is included in the MAC header thereby being located before the MAC sub-headers. The MAC sub-headers include one or more subheaders indicating at least one of a MAC CE and MAC SDUs.

Another example of a format of a MAC header indicating a source UE ID and a destination ID or a part of the destination ID in a connectionless communication system according to an embodiment of the present disclosure has been described with reference to FIG. 11A, and still another example of a format of a MAC header indicating a source UE ID and a destination ID or a part of the destination ID in a connectionless communication system according to an embodiment of the present disclosure will be described with reference to FIG. 11B.

Figure 11B:
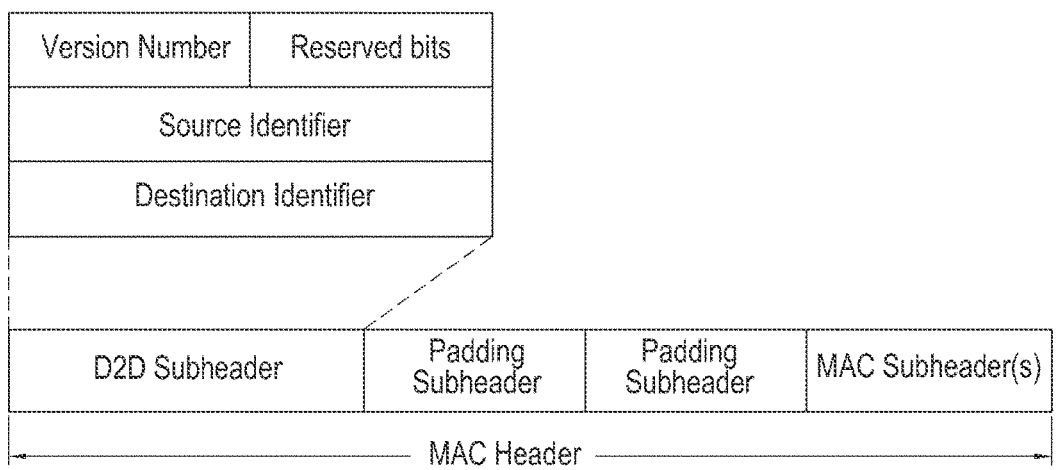
FIG. 11B schematically illustrates still another example of a format of a MAC header indicating a source UE ID and a destination ID in a connectionless communication system according to an embodiment of the present disclosure.

FIG. 11B schematically illustrates still another example of a format of a MAC header indicating a source UE ID and a destination ID or a part of the destination ID in a connectionless communication system according to an embodiment of the present disclosure.

Referring to FIG. 11B, it will be noted that a MAC header in FIG. 11B is a MAC header in a case that two-byte padding is considered. The MAC header includes a D2D subheader, two padding sub-headers, and MAC sub-headers. The D2D subheader includes a MAC PDU format version number field, a source identifier field, and a destination identifier field. The padding subheader is present after the D2D subheader and before MAC sub-headers. The source identifier field includes a source UE ID, and the destination identifier field includes a destination ID or a part of the destination ID. The padding sub-header includes padding. Here, the padding sub-header is included in the MAC header thereby being located before the MAC sub-headers. The MAC sub-headers include one or more subheader indicating at least one of a MAC CE and MAC SDUs.

A process of including a source UE ID and a destination ID or a part of the destination ID into a MAC header using the second implementation scheme in a connectionless communication system according to an embodiment of the present disclosure has been described above, and a process of including a source UE ID and a destination ID or a part of the destination ID into a MAC header using the third implementation scheme in a connectionless communication system according to an embodiment of the present disclosure will be described below.

In a connectionless communication system according to an embodiment of the present disclosure, a MAC Control Element (CE) which carries a source UE ID and a destination ID or a part of the destination ID is defined. The MAC CE is indicated by a MAC sub-header, and the MAC sub-header includes an LCID field. The LCID field includes information indicating whether a related MAC CE is a MAC CE including the source UE ID and the destination ID. The MAC CE including the source UE ID and the destination ID may be the first MAC CE field included in a MAC PDU payload. Alternatively, two MAC CEs wherein one includes the source UE ID and another includes the Destination ID is defined.

A process of including a source ID and a destination ID into a MAC header using the third implementation scheme in a connectionless communication system according to an embodiment of the present disclosure has been described above, and a process of including a source ID and a destination ID into a MAC header using the fourth implementation scheme in a connectionless communication system according to an embodiment of the present disclosure will be described below.

In a connectionless communication system according to an embodiment of the present disclosure, a MAC header includes at least one MAC sub-header. The MAC sub-header indicates a source UE ID and at least a part of a destination ID, and this will be described with reference to FIG. 12.

Figure 12:
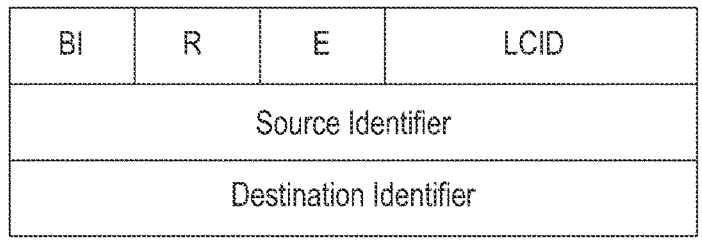
FIG. 12 schematically illustrates another example of a format of a MAC sub-header indicating a source UE ID and a destination ID in a connectionless communication system according to an embodiment of the present disclosure.

FIG. 12 schematically illustrates another example of a format of a MAC sub-header indicating a source UE ID and at least a part of a destination ID in a connectionless communication system according to an embodiment of the present disclosure.

Referring to FIG. 12, the MAC sub-header includes a BI field, a R field, an E field, an LCID field, a source identifier field, and a destination identifier field.

The BI field includes information indicating whether the destination identifier field is included in the MAC sub-header, and may be implemented with 1 bit. If a value of the BI field is set to 1, the MAC sub-header does not include the destination identifier field. If a value of the BI field is set to 0, the MAC sub-header includes the destination identifier field.

The R field represents a reserved field, the E field includes information indicating whether there is other MAC sub-header following the MAC sub-header, the LCID field includes information indicating that the MAC sub-header carriers a source UE ID and at least a part of a destination ID, the source identifier field includes the source UE ID, and the destination identifier field includes at least a part of the destination ID.

Meanwhile, a location of the MAC sub-header indicating the source UE ID and at least a part of the destination ID may be determined based on the following rules.

Firstly, if there is no padding in the MAC PDU, or if a length of the padding is more than a preset length, e.g., 2 bytes, the MAC sub-header indicating the source UE ID and at least a part of the destination ID may be the first MAC sub-header among MAC sub-headers included in the MAC PDU.

Secondly, if the length of the padding included in the MAC PDU is the preset length, e.g., 1 byte, the MAC sub-header indicating the source UE ID and at least a part of the destination ID may be the second MAC sub-header among the MAC sub-headers included in the MAC PDU. In this case, the first MAC sub-header among the MAC sub-headers included in the MAC PDU is a padding sub-header.

Thirdly, if the length of the padding included in the MAC PDU is the preset length, e.g., 2 bytes, the MAC sub-header indicating the source UE ID and at least a part of the destination ID may be the third MAC sub-header among the MAC sub-headers included in the MAC PDU. In this case, the first and second MAC sub-headers among the MAC sub-headers included in the MAC PDU are padding sub-headers.

A process of including a source UE ID and at least a part of a destination ID into a MAC header using the fourth implementation scheme in a connectionless communication system according to an embodiment of the present disclosure has been described above, and a process of including a source UE ID and at least a part of a destination ID into a MAC header using the fifth implementation scheme in a connectionless communication system according to an embodiment of the present disclosure will be described below.

In a connectionless communication system according to an embodiment of the present disclosure, a MAC header includes at least one MAC sub-header. The MAC sub-header indicates a source UE ID and at least a part of a destination ID, and this will be described with reference to FIG. 13.

Figure 13:
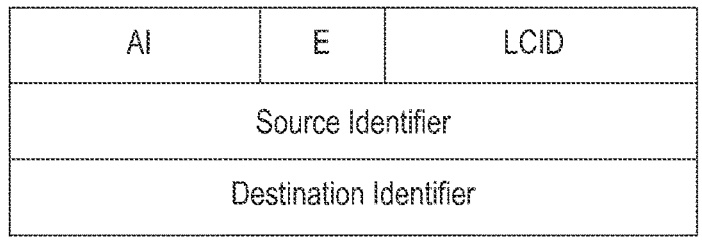
FIG. 13 schematically illustrates still another example of a format of a MAC sub-header indicating a source UE ID and a destination ID in a connectionless communication system according to an embodiment of the present disclosure.

FIG. 13 schematically illustrates still another example of a format of a MAC sub-header indicating a source UE ID and at least a part of a destination ID in a connectionless communication system according to an embodiment of the present disclosure.

Referring to FIG. 13, the MAC sub-header includes an AI field, an E field, an LCID field, a source identifier field, and a destination identifier field.

The AI field includes information indicating one of that the destination identifier field is set to a group ID, that the destination identifier field is set to a destination ID, and that the destination identifier field is not set to any value.

The E field includes information indicating whether there is other MAC sub-header following the MAC sub-header, the LCID field includes information indicating that the MAC sub-header carriers a source UE ID and at least a part of a destination ID, the source identifier field includes the source UE ID, and the destination identifier field includes a group ID or at least a part of the destination ID based on a value of the AI field, or does not include any value.

A process of including a source UE ID and at least a part of a destination ID into a MAC header using the fifth implementation scheme in a connectionless communication system according to an embodiment of the present disclosure has been described above, and an inner structure of a BS in a connectionless communication system according to an embodiment of the present disclosure will be described with reference to FIG. 14.

Figure 14:
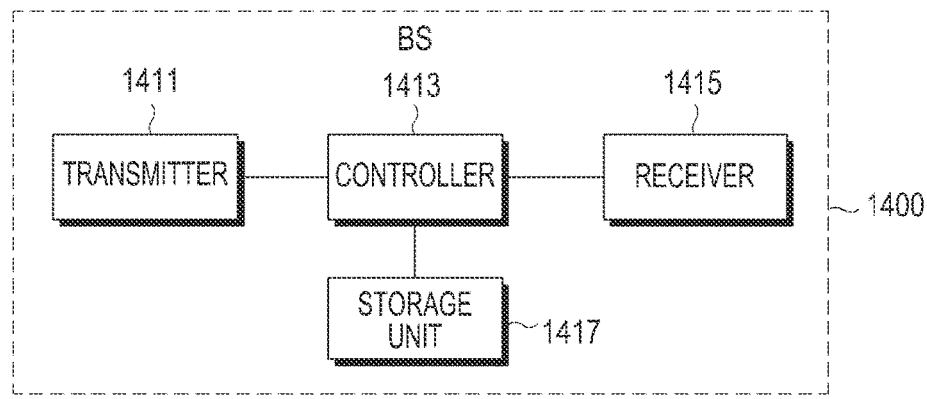
FIG. 14 schematically illustrates an inner structure of a BS in a connectionless communication system according to an embodiment of the present disclosure.

FIG. 14 schematically illustrates an inner structure of a BS in a connectionless communication system according to an embodiment of the present disclosure.

Referring to FIG. 14, a BS 1400 includes a transmitter 1411, a controller 1413, a receiver 1415, and a storage unit 1417.

The controller 1413 controls the overall operation of the BS 1400. More particularly, the controller 1413 controls the BS 1400 to perform an operation related to a user plane protocol stack operating operation. The operation related to the user plane protocol stack operating operation is performed in the manner described with reference to FIGS. 2 to 13, and a description thereof will be omitted herein.

The transmitter 1411 transmits various signals, various messages, and the like to a UE, and the like under a control of the controller 1413. The various signals, the various messages, and the like transmitted in the transmitter 1411 have been described in FIGS. 2 to 13, and a description thereof will be omitted herein.

The receiver 1415 receives various signals, various messages, and the like from the UE, and the like under a control of the controller 1413. The various signals, the various messages and the like received in the receiver 1415 have been described in FIGS. 2 to 13, and a description thereof will be omitted herein.

The storage unit 1417 stores a program and various data necessary for the operation of the BS 1400, information related to the user plane protocol stack operating operation according to an embodiment of the present disclosure, and the like. The storage unit 1417 stores the various signals, the various messages, and the like received in the receiver 1415.

While the transmitter 1411, the controller 1413, the receiver 1415, and the storage unit 1417 are described as separate processors, it is to be understood that this is merely for convenience of description. In other words, two or more of the transmitter 1411, the controller 1413, the receiver 1415, and the storage unit 1417 may be incorporated into a single processor.

An inner structure of a BS in a connectionless communication system according to an embodiment of the present disclosure has been described with reference to FIG. 14, and an inner structure of a UE in a connectionless communication system according to an embodiment of the present disclosure will be described with reference to FIG. 15.

Figure 15:
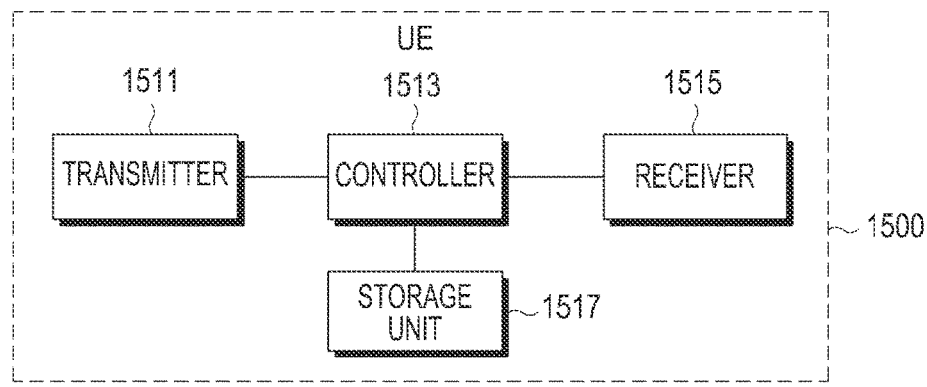
FIG. 15 schematically illustrates an inner structure of a UE in a connectionless communication system according to an embodiment of the present disclosure.

FIG. 15 schematically illustrates an inner structure of a UE in a connectionless communication system according to an embodiment of the present disclosure.

Referring to FIG. 15, a UE 1500 includes a transmitter 1511, a controller 1513, a receiver 1515, and a storage unit 1517.

The controller 1513 controls the overall operation of the UE 1500. More particularly, the controller 1513 controls the UE 1500 to perform an operation related to a user plane protocol stack operating operation. The operation related to the user plane protocol stack operating operation is performed in the manner described with reference to FIGS. 2 to 13, and a description thereof will be omitted herein.

The transmitter 1511 transmits various signals, various messages, and the like to a BS, and the like under a control of the controller 1513. The various signals, the various messages, and the like transmitted in the transmitter 1511 have been described in FIGS. 2 to 13, and a description thereof will be omitted herein.

The receiver 1515 receives various signals, various messages, and the like from the BS, and the like under a control of the controller 1513. The various signals, the various messages and the like received in the receiver 1515 have been described in FIGS. 2 to 13, and a description thereof will be omitted herein.

The storage unit 1517 stores a program and various data necessary for the operation of the UE 1500, information related to the user plane protocol stack operating operation according to an embodiment of the present disclosure, and the like. The storage unit 1517 stores the various signals, the various messages, and the like received in the receiver 1515.

While the transmitter 1511, the controller 1513, the receiver 1515, and the storage unit 1517 are described as separate processors, it is to be understood that this is merely for convenience of description. In other words, two or more of the transmitter 1511, the controller 1513, the receiver 1515, and the storage unit 1517 may be incorporated into a single processor.

As is apparent from the foregoing description, an embodiment of the present disclosure enables to operate a user plane protocol stack in a connectionless communication system.

An embodiment of the present disclosure enables to operate a user plane protocol stack by considering a radio bearer in a connectionless communication system.

An embodiment of the present disclosure enables to operate a user plane protocol stack by considering a logical channel in a connectionless communication system.

An embodiment of the present disclosure enables to operate a user plane protocol stack based on a source UE ID and at least a part of a destination ID in a connectionless communication system.

An embodiment of the present disclosure enables to operate a user plane protocol stack based on a transmission session type in a connectionless communication system.

An embodiment of the present disclosure enables to operate a user plane protocol stack by considering data compression in a connectionless communication system.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disk (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for device to device (D2D) communication by a sender user equipment (UE), the method comprising:
    identifying a first part of a destination identifier (ID) for identifying target of data for the D2D communication, and a second part of the destination ID, wherein the second part of the destination ID is different from the first part of the destination ID;
    transmitting control information including the first part of the destination ID to a receiver UE, wherein the first part of the destination ID is used for filtering packets at a physical layer of the receiver UE; and transmitting a medium access control (MAC) protocol data unit (PDU) including a MAC header including the second part of the destination ID to the receiver UE, wherein the second part of the destination ID is used for filtering packets at a MAC layer of the receiver UE.

2. The method of claim 1, wherein the first part of the destination ID is a least significant bit (LSB) part of the destination ID, and the second part of the destination ID is a most significant bit (MSB) part of the destination ID.

3. The method of claim 1, further comprising:
identifying a first part of a source ID and a second part of the source ID,
wherein the control information further includes the first part of the source ID, and the MAC PDU further includes the second part of the source ID.

4. The method of claim 3, wherein the first part of the source ID is a least significant bit (LSB) part of the source ID, and the second part of the source ID is a most significant bit (MSB) part of the source ID.

5. The method of claim 3, wherein the first part of the source ID is used for filtering packets at the physical layer of the receiver UE, and the second part of the source ID is used for filtering packets at the MAC layer of the receiver UE.

6. A sender user equipment (UE) for device to device (D2D) communication, the sender UE comprising:
a transceiver; and
a processor coupled to the transceiver, wherein the processor is configured to:
identify a first part of a destination identifier (ID) for identifying target of data for the D2D communication, and a second part of the destination ID, wherein the second part of the destination ID is different from the first part of the destination ID,
transmit control information including the first part of the destination ID to a receiver UE, wherein the first part of the destination ID is used for filtering packets at a physical layer of the receiver UE, and
transmit a medium access control (MAC) protocol data unit (PDU) including a MAC header including the second part of the destination ID to the receiver UE, wherein the second part of the destination ID is used for filtering packets at a MAC layer of the receiver UE.

7. The sender UE of claim 6, wherein the first part of the destination ID is a least significant bit (LSB) part of the destination ID, and the second part of the destination ID is a most significant bit (MSB) part of the destination ID.

8. The sender UE of claim 6, wherein the processor is further configured to:
identify a first part of a source ID and a second part of the source ID,
wherein the control information further includes the first part of the source ID, and the MAC PDU further includes the second part of the source ID.

9. The sender UE of claim 8, wherein the first part of the source ID is a least significant bit (LSB) part of the source ID, and the second part of the source ID is a most significant bit (MSB) part of the source ID.

10. The sender UE of claim 8, wherein the first part of the source ID is used for filtering packets at the physical layer of the receiver UE, and the second part of the source ID is used for filtering packets at the MAC layer of the receiver UE.

* * * * *